US008559882B2

(12) United States Patent
Williams

(10) Patent No.: US 8,559,882 B2
(45) Date of Patent: *Oct. 15, 2013

(54) SYSTEM AND METHOD FOR AUTOMATED RADIO FREQUENCY SAFETY AND REGULATORY COMPLIANCE AT WIRELESS TRANSMISSION SITES

(75) Inventor: Douglas M. Williams, Del Mar, CA (US)

(73) Assignee: RF Check, Inc., Del Mar, CA (US)

( * ) Notice: Subject to any disclaimer, the term of this patent is extended or adjusted under 35 U.S.C. 154(b) by 1134 days.

This patent is subject to a terminal disclaimer.

(21) Appl. No.: 12/493,891

(22) Filed: Jun. 29, 2009

(65) Prior Publication Data

US 2009/0270041 A1 Oct. 29, 2009

Related U.S. Application Data

(63) Continuation of application No. 11/394,555, filed on Mar. 31, 2006, now Pat. No. 7,570,922, which is a continuation-in-part of application No. 11/100,947, filed on Apr. 6, 2005, now abandoned, which is a continuation-in-part of application No. 10/215,495, filed on Aug. 8, 2002, now abandoned.

(51) Int. Cl.
  *H04B 17/00* (2006.01)
(52) U.S. Cl.
  USPC ..... 455/67.11; 455/423; 455/424; 455/426.1; 455/422.1
(58) Field of Classification Search
  USPC ........ 455/67.11, 423, 424, 426.1, 422.1, 520, 455/515, 63.2, 551, 552.1, 553.1, 554.2, 455/566; 705/1, 810
  See application file for complete search history.

(56) References Cited

U.S. PATENT DOCUMENTS

| 5,491,644 | A | 2/1996 | Pickering |
| 5,561,841 | A | 10/1996 | Markus |
| 5,710,758 | A | 1/1998 | Soliman et al. |
| 6,008,808 | A | 12/1999 | Almeida et al. |
| 6,021,316 | A | 2/2000 | Heiska et al. |
| 6,336,035 | B1 | 1/2002 | Somoza et al. |
| 6,356,758 | B1 | 3/2002 | Almeida et al. |
| 6,640,089 | B1 | 10/2003 | Kanaan et al. |

(Continued)

OTHER PUBLICATIONS

Angelo GC et al.: "Health and Penetration Issues in Buildings with GSM Base Station Antennas on Top," Vehicular Technology Conference, 1998. VTC 98. 48th IEEE Ottawa, Ontario., Canada May 18-21, 1998, New York, NY, USA, IEEE, US, May 18, 1998, pp. 450-454, XP010287820, ISBN: 0-7803-4320-4.

(Continued)

*Primary Examiner* — Tuan Pham
(74) *Attorney, Agent, or Firm* — Procopio, Cory, Hargreaves & Savitch LLP

(57) ABSTRACT

Maintaining information about radio transmission sites in a computer accessible database. In one aspect this is a living database consisting of hundreds of thousands of wireless sites and their unique characteristics. The database includes energy transmissions information including site specific physical locations and utilization characteristics of the sites. The System can deliver MPE maps of radio frequency radiation and site specific safety programs to any worker visiting a wireless site in the United States. These maps (and site's specific safety programs) are updated on a daily basis. The System can be accessed via the Internet by registered users. The System creates and displays MPE maps and radiation pattern maps showing gradation power densities to identify exposure dangers.

16 Claims, 21 Drawing Sheets

(56) References Cited

U.S. PATENT DOCUMENTS

| | | | |
|---|---|---|---|
| 6,792,269 | B2 | 9/2004 | Boehmke |
| 6,876,856 | B2 | 4/2005 | Fattouch |
| 6,973,622 | B1 | 12/2005 | Rappaport et al. |
| 7,570,922 | B2 * | 8/2009 | Williams .................... 455/67.11 |
| 2002/0125999 | A1 | 9/2002 | Cho et al. |
| 2003/0018708 | A1 * | 1/2003 | Hlasny .......................... 709/203 |
| 2003/0210228 | A1 | 11/2003 | Ebersole et al. |
| 2004/0030562 | A1 | 2/2004 | Williams |
| 2007/0150442 | A1 * | 6/2007 | Chin et al. ......................... 707/3 |
| 2008/0059531 | A1 * | 3/2008 | Singh et al. ................. 707/104.1 |

OTHER PUBLICATIONS

International Search Report for PCT/US07/64609 issued Feb. 14, 2008.

Summons to Attend Oral Proceedings pursuant to Rule 115(1) EPC for related EP Patent Application No. 07759092.5, mailed Aug. 5, 2013, in 7 pages.

Federal Communications Commission Office of Engineering & Technology. "Evaluating Compliance with FCC Guidelines for Human Exposure to Radiofrequency Electromagnetic Fields." OET Bulletin 65, Edition 97-01, Aug. 1997. 84 pages.

* cited by examiner

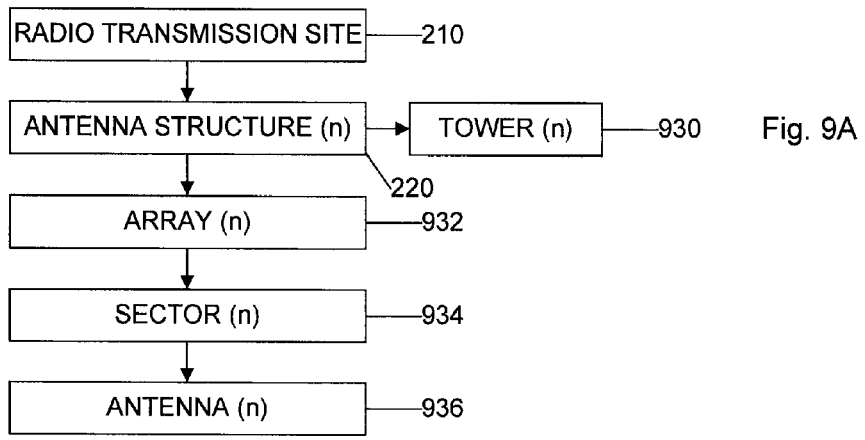
Fig. 9A
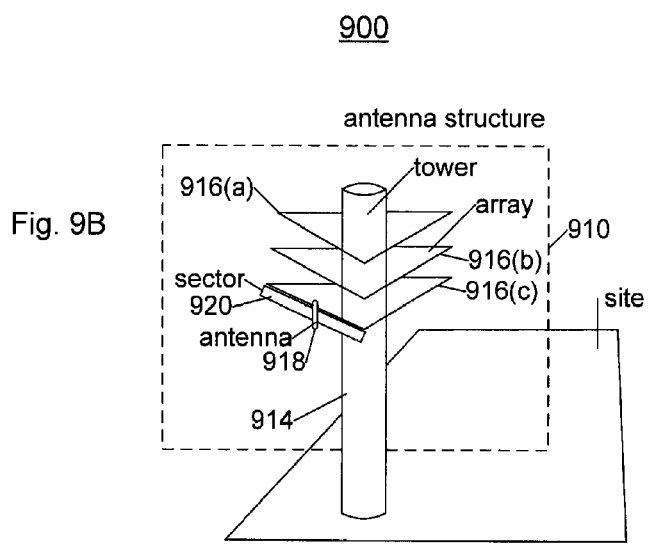
Fig. 9B
Fig. 9

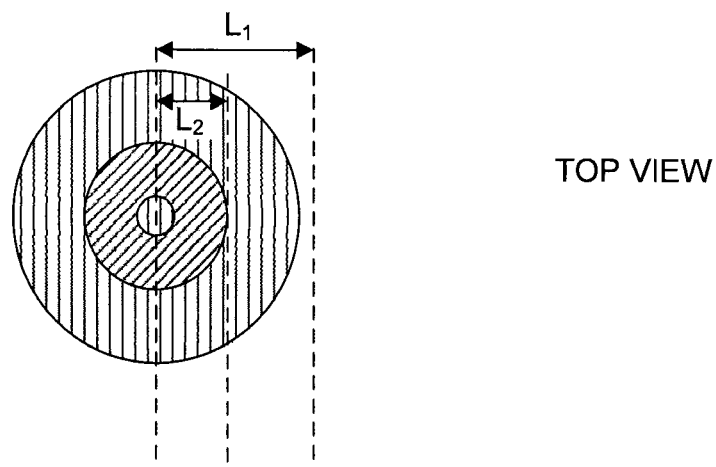
TOP VIEW
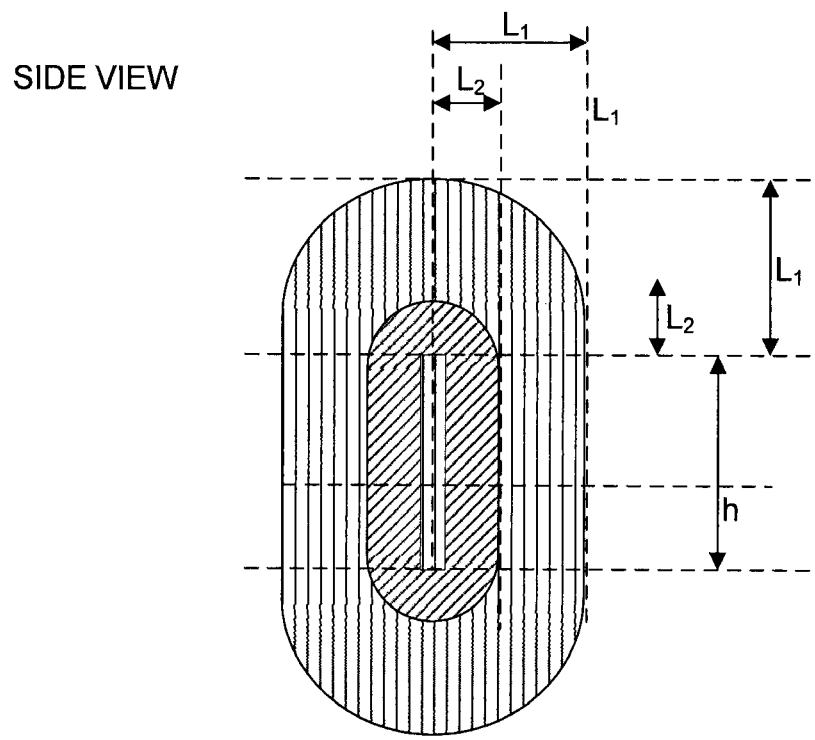
SIDE VIEW
Fig. 14

SYSTEM AND METHOD FOR AUTOMATED
RADIO FREQUENCY SAFETY AND
REGULATORY COMPLIANCE AT WIRELESS
TRANSMISSION SITES

RELATED APPLICATION

This application is a continuation application of U.S. patent application Ser. No. 11/394,555 entitled "System and Method For Automated Radio Frequency Safety and Regulatory Compliance At Wireless Transmission Sites," filed Mar. 31, 2006, (now U.S. Pat. No. 7,570,922, issued Aug. 4, 2009), which is a continuation-in-part of U.S. application Ser. No. 11/100,947, filed Apr. 6, 2005 now abandoned, which is a continuation-in-part of U.S. application Ser. No. 10/215,495, filed Aug. 8, 2002 now abandoned. U.S. patent application Ser. No. 11/394,555 is incorporated herein by reference in its entirety.

FIELD OF THE INVENTION

This invention relates generally to information storage and retrieval systems and more particularly to such a system particularly adapted for the monitoring and control of energy transmission sites for worker safety.

RELATED ART

The current systems of protecting field workers from radio frequency ("RF") exposure at radio transmission sites are inadequate and often in violation of existing state and federal regulations. There are currently enormous cellular networks consisting of thousands of base station antennas which are required to enable cell phone use. These wireless transmission sites come with an environmental hazard as they generate RF radiation. RF radiation ("RFR") is tasteless, odorless and invisible, increasing the need for a comprehensive RF safety compliance program. The damaging health effects from excessive RF exposures may not be apparent until long after the exposures occurred. On a daily basis, unaware and unprotected construction and maintenance workers, as well as the industry's own RF-trained workforce, risk sustaining some form of injury from RF radiation exposure at conventional and stealth sites. The present system of signs to warn workers is inaccurate and ambiguous. In many instances warning signs are missing or poorly placed, and have text that is ambiguous or difficult to interpret. The swift expansion of the wireless industry and the number of transmission sites has increased dramatically over the last decade. Many sites contain multiple antennas owned by different cellular phone companies, wireless data carriers, wireless network companies and other providers of wireless services "wireless telecommunication companies". For example some of these companies are Sprint, Verizon and Cingular or other wireless telecommunication companies may all have an antenna at one site. Sites that are used by more than one wireless company may have greater dangers due to the overlap of energy dispersion patterns, and this is not taken into account by any one of the companies, primarily due to poor mutual information availability.

Wireless telecommunication companies provide equipment and training to their own workforce but do not provide the same to other workers such as roofers, painters or heating, ventilation and air-conditioning craftsmen who work near their transmitters. Personal protection monitors have severe limitations and can give a false sense of security. Wireless telecommunication companies have a poor policy regarding the hazards of RF exposure with site lessors. Little or no information is available to educate lessor's third party workers on safety procedures. Stealth sites can present the most potential hazards to unsuspecting third party workers. Third party workers are at the greatest risk of injury from RF exposure. There is no comprehensive worker safety program in place. Litigation regarding RF exposure is growing and is expected to grow exponentially because of the lack of significant worker safety standards and applications.

SUMMARY

Aspects of the present invention include a system which provides safety information, promotes protection of all interested parties from RFR, and informs workers and wireless telecommunication companies how to comply with federal, state and local RF safety standards and regulations. Aspects of the invention can also provide benefits to federal, state and local municipalities.

One aspect of this invention includes a safety system and method for managing and viewing radio transmission information for transmission sites. In one aspect the system includes a living database including transmitter information and unique characteristics for transmitters located at thousands of transmission sites obtained from a plurality of wireless telecommunication companies and indexed by site. The system can be accessed on line through the word wide network. The system contains cost saving engineering tools, photographs of each antenna, and the ability to deliver MPE Maps of the invisible RF emissions to any worker visiting a wireless site. The MPE maps can be updated on a daily basis.

In one aspect, the system's integration of RF data and MPE tools results in a comprehensive safety net as well as providing cost savings for cities and municipalities who must insure the public's safety. This system also assists in identifying and eliminating interference from rogue transmitters.

In one aspect, the system provides a computerized site specific safety program for each site. This site specific safety program is automatically updated on a regular basis and/or when changes are made to a site. The system has a automated safety audit program which runs periodically, for example, monthly and annually, to confirm that sites are in compliance with all relevant regulations, including international, Federal and State. The automated safety audit program generates compliance reports which can be date stamped and encrypted in order to meet regulatory record keeping requirements. These compliance reports can be provided to regulatory agencies to confirm compliance.

A site search module is configured to define search parameters, accept search criteria selected by a user, transmit a search request based upon selected search criteria, and provide search results to the user. A database search module is configured to receive the search query, search the database for resident information based upon the search query, and transmit the search results to the site search module. A site information display module is configured to provide the user with power density information or radiation pattern maps for all of the transmitters located on a site identified in the search results.

In a further aspect, the system includes a power down request module which is configured to send an email to the wireless telecommunication company, site owner, property management company and city or municipality associated with the site where the antenna structure is located, create a database entry about the power down request, and send a confirmation of power shut down or a power reduction to the user.

In a further aspect the site search module allows a user to filter sites by power line types. Additionally, the site search module allows the user to obtain information on site safety for specific sites.

In a further aspect, the system includes an engineering tools module which allows the user to create hypothetical antennas which can be placed into an existing site thereby allowing the user to create MPE maps with the hypothetical antenna and one or more existing antenna at the site, determine intermodulation between the hypothetical antenna and one or more of the existing antennas, and determine isolation between the hypothetical antenna and one or more of the existing antennas.

A further aspect includes a method for receiving data from a plurality of sources about radio transmission sites, which have one or more antenna. In one embodiment the system receives data from various wireless telecommunication companies such as Verizon, Cingular, and Sprint. The method includes receiving data from a plurality of sources, maintaining a database with the received data, receiving queries from users regarding radio transmission sites, transmitting data maintained in the database to customers, and processing queries from users regarding a radio transmission site in order to create maximum permissible exposure maps based on the data in the database.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 9A and 9B is a graphical representation of a physical site and a generalized site data structure.

FIG. 14 is a graphical representation of a MPE map of an omni-directional antenna from the top and side view perspective.

DETAILED DESCRIPTION

Certain embodiments as disclosed herein provide for systems and methods for a wireless location monitoring and reporting system ("System").

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

The present invention includes a method for using an information storage and retrieval system and includes establishing a database structure enabling the storage of information concerning the locations and utilization characteristics of wireless radio frequency (RF) transmitting facilities (referred to as sites) such as those used in cellular telephone networks and for the commercial telecommunication industry. The system and methods provide safety tools for protecting workers from RFR hazards and provide auditing in order to document compliance with applicable regulations.

Electronic access to the information database can be made available over the Internet to the Systems' subscribers, referred to as "users" in this specification. Maximum Permissible Exposure (MPE) maps and the data necessary to perform electromagnetic energy (EME) studies are created using the information database. The Systems and methods described herein can provide greater worker safety, eliminate the disproportional amount of liability currently shouldered by wireless telecommunication companies, and reduce RF exposure to persons involved in site management.

Figure 1:
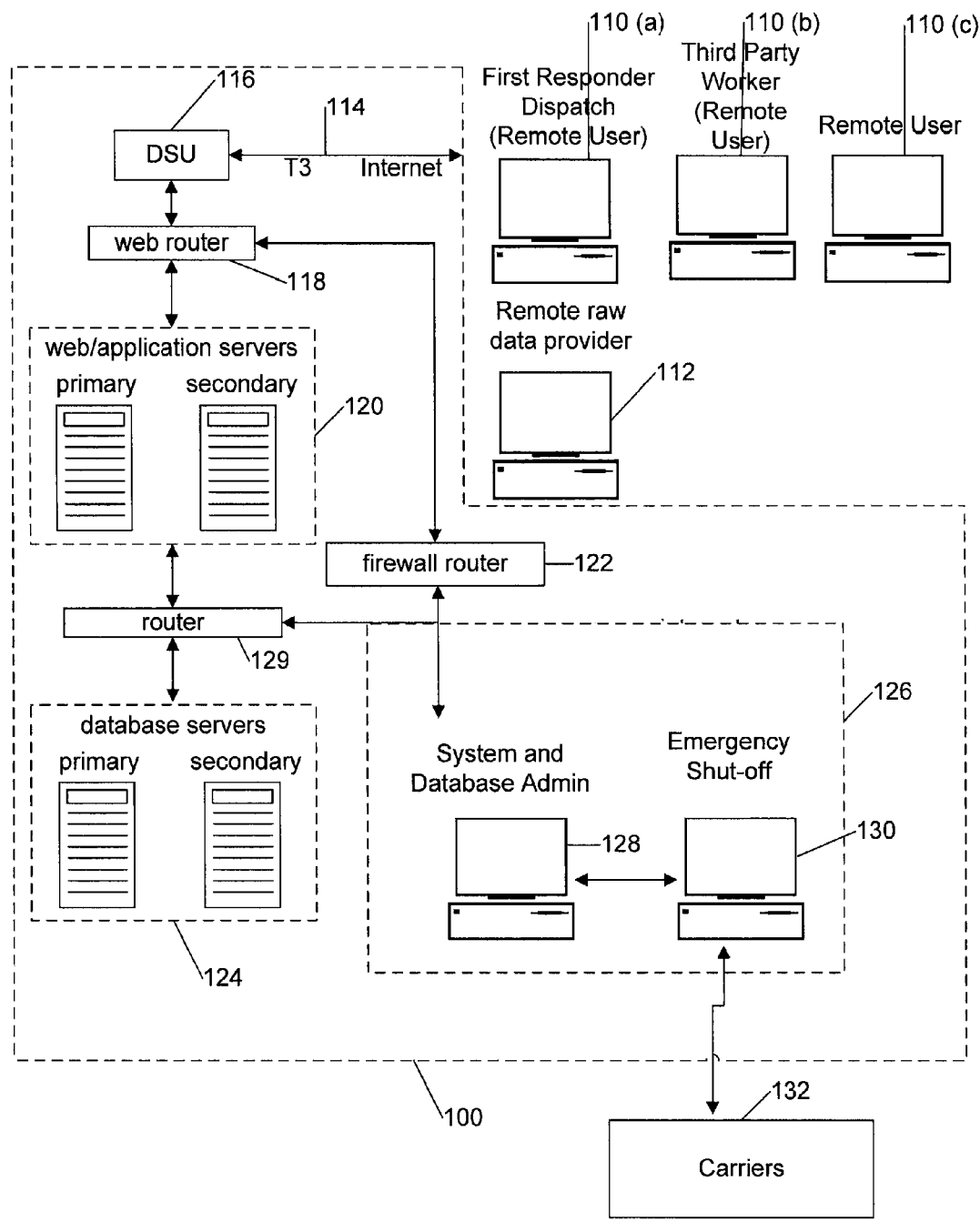
FIG. 1 is a high level block diagram illustrating an example network and the system.

FIG. 1 is a high level block diagram of an example network including the System 100. The System 100 can communicate with users via an external network 114 such as the internet. As an example, the remote users 110 *a-c* and a remote raw data provider 112 are shown. The System also includes a system and database administration module 128 within the company intranet 126 which can interact with the System directly. When communication traffic first enters the System 100 it passes through a data switch unit ("DSU") 116. The traffic from the DSU is passed to a web router 118. From the web router the traffic flows to the web application servers 120. The web application servers in general, provide user interfaces. In one embodiment the web application servers include a primary application server and a back-up secondary server. The web application servers 120 communicate through a firewall router 122 with the database servers 124.

Figure 2A:
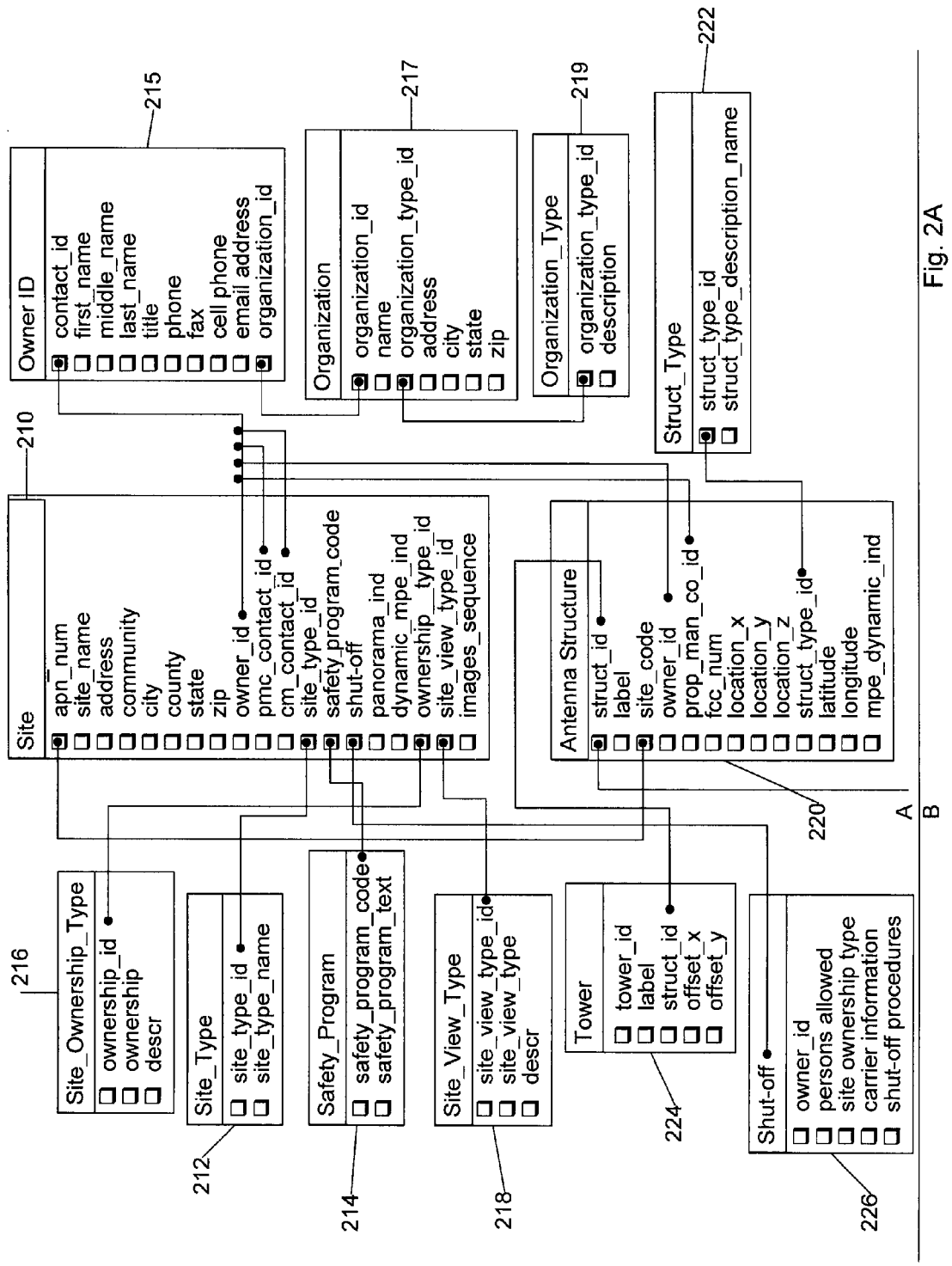
FIGS. 2A and 2B are a database diagram or schema illustrating an example of a single site's physical attributes
Figure 2B:
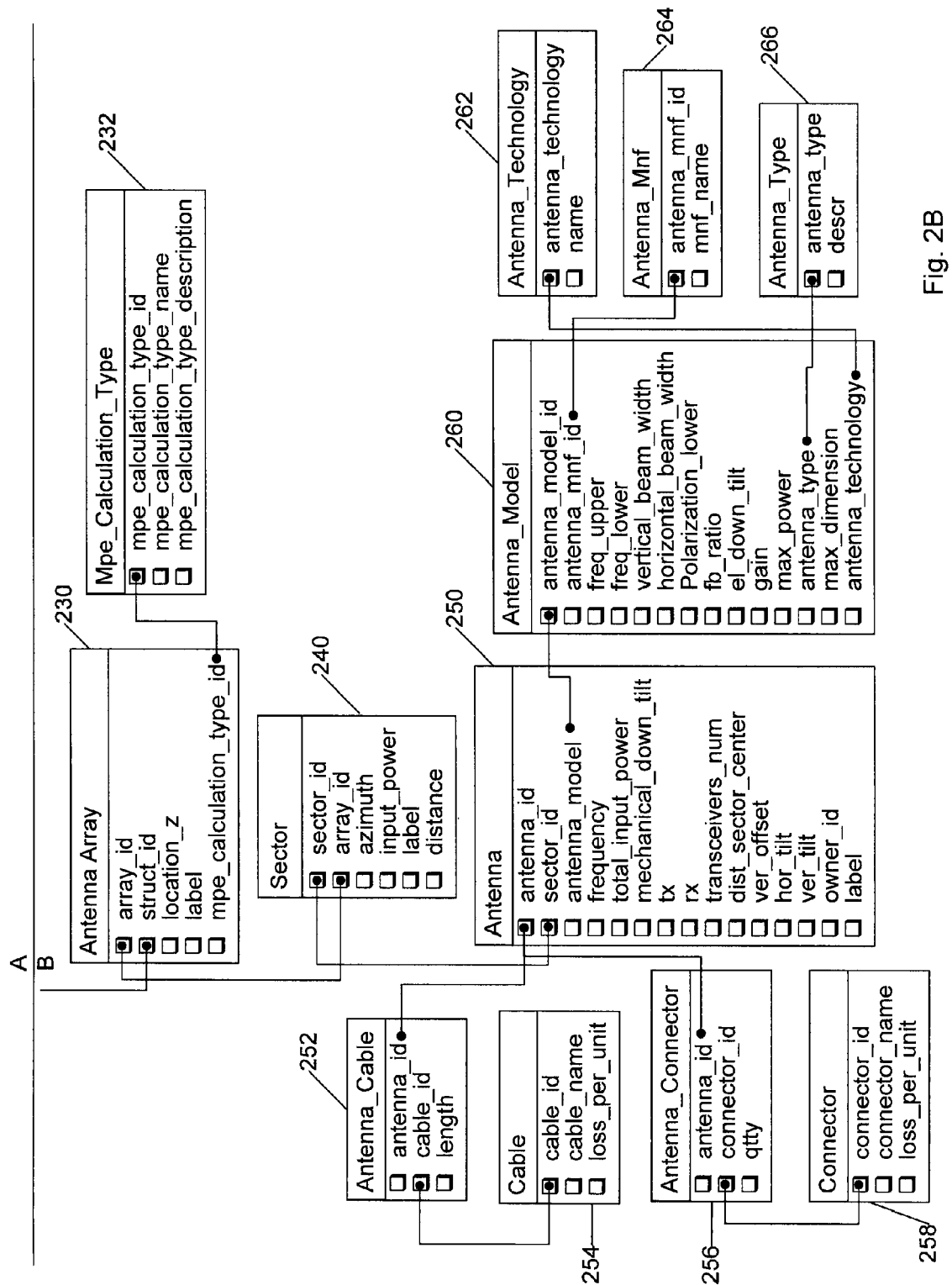

FIGS. 2A and 2B are a database diagram or schema illustrating an example of a single site's physical attributes. The representation has been divided into two figures for convenience. The database can be implemented on the database servers 124 of FIG. 1. In one embodiment this technology is built on the Microsoft N-tier Distributed Network Architecture ("DNA"), which separates the database, data access, business logic, and presentation layers to provide ultimate security, scalability and performance for high volume database applications. The database includes multiple tables which each have resident information. In the embodiment depicted in FIG. 2, a very complete set of information for a site is maintained. Obviously, less complete data sets can also be used.

Each site table 210 has associated with it a site code which is unique to each site, an assessor's parcel number ("APN") for that site, a site name, an address, a community, a city, a county abbreviation, a state code, a zip code, owner contact login, PMC contact login which identifies a site's property management company, a CM contact login which identifies a site's city or municipality, a site type which can be characterized as the type of wireless site, a safety program code which identifies the site's specific safety program, a panorama IND which indicates if a panoramic image is used for the site preview, a dynamic MPE IND which indicates if maximum permissible exposure ("MPE") maps are created dynamically on the client side, or are stored in the database, ownership type id including commercial, city leased, city owned or other, site view type id, and images sequence.

The site type id set forth in the site table 210 associated with it a site type table 212. The site type table includes a unique site type id and a site type name. The safety program code in the site table 210 has associated with it a safety program table 214. The safety program table includes a unique safety program code and safety program text. The ownership id of the site table 210 has associated with it a site ownership type table 216. The site ownership type table 216 includes an ownership id, ownership and description. The site view type id of the site table 210 has associated with it a site view type table 218. The site view type table includes a unique site view type id, a site view type indicates what type of image sequence is used for site camera view. In various embodiments some examples of these views are as follows:

Site view type 1: top left, top right, lower-left, lower-right.
Site view type 2: north, east, south, west.
Site view type 3: numbered images.

The owner_id, pmc_contact_id, cm_contact_id of the site table 210 have associated with it a contact table 215. The contact table 215 includes a contact id, first name, middle name, last name, title, phone, fax, cell phone, email address and organization id. The organization id of the contact table 215 has associated with it an organization table 217. The organization table 217 includes a unique organization id, name, organization type id, address, city, state and zip code. The organization type id of the organization table 217 has associated with it an organization type table 219. The organization type table 219 includes a unique organization type id and description.

An antenna structure table 220 is associated with the site table 210 by the site code. The structure table 220 includes a unique structure id, owner id, property management company id, FCC number (a structure/tower registration number assigned by the Federal Communications Commission), location x value coordinate, location y value coordinate, location z value coordinate, a label, antenna structure id, a structure type id which identifies structure type for example: raw-land mounted or rooftop mounted, latitude and longitude. The structure id of the structure table 220 has associated with it a tower table 224. The tower table 224 includes a unique tower id, label, a corresponding structure id, an offset x value and an offset y location value. The structure type id of the structure table 220 has associated with it a structure type table 222. The structure type table includes the unique structure type id and the structure type name.

The antenna structure table 220 is associated with the array table 230 by the structure id. The array table includes a unique array id, a structure id, a location z value, a label, and a map calculation type id indicates what type of MPE calculation is used for the array: conservative, contribution, etc. The MPE calculation type id of the array table 230 is associated with a map calculation type table 232. The MPE calculation type table 232 includes a unique calculation type id (explained in more detail below), a MP calculation type name, and a MPE calculation type description.

The array table 230 is associated with a sector table 240 by the array id. The sector table includes a unique sector id, an array id, an azimuth, which will be explained in connection with FIG. 12, an input power value, a label and a distance value showing the distance from the sector to the center of the antenna structure.

The sector table 240 is associated with the antenna table 250 by the sector id. The antenna table includes a unique antenna id number, a sector id number, an antenna model, the frequency for the antenna, the total input power to the antenna, the mechanical down tilt (the default orientation of the antenna in a vertical plane—the vertical angular distance from a reference direction parallel to ground level), the TX value (indicates whether the antenna is a transmitter), the RX value (indicates whether the antenna is a receiver), the transceiver's number (one antenna can have multiple transceivers and these are numbered), the distance from sector center (indicates distance of antenna from the center of the sector), the VER offset (the offset from the antenna default position in a vertical plane, the horizontal tilt factor which is the horizontal angular distance from a reference direction), the vertical tilt factor, and the vertical angular distance from a reference direction (parallel to ground level), the owner id and a label. The antenna model information of the antenna table 250 is associated with an antenna model table 260.

The antenna model table 260 includes a unique antenna model id, an antenna manufacturer id, a frequency upper (the highest frequency value for the antenna), a frequency lower (the lowest frequency value of the antenna), a vertical beam width (vertical width of the antenna's radiation pattern), a horizontal beam width (horizontal width of the antenna's radiation pattern), a polarization lower (polarization of the wave radiated by the antenna), a FB ratio (front-to-back ratio—percentage value of the power compared to the power in a direction 180° from the specified azimuth), an EL down tilt (remote electrical antenna down tilt angle), a gain value (the relative increase in radiation at the maximum point expressed as a value in dB above a standard), a max power value, an antenna type, a maximum dimension value and an antenna technology.

The antenna technology of the antenna model table 260 is associated with the antenna technology table 262. The antenna technology table includes antenna technology and a name. The antenna manufacturer id of the antenna model table 260 is associated with the antenna manufacturer table 264. The antenna manufacturer table 264 includes an antenna manufacturer id and the manufacturer's name. The antenna type of the antenna model table 260 is associated with an antenna table 266. The antenna type table 266 includes the antenna type and name.

The antenna id of the antenna table 250 is associated with an antenna cable table 252. The antenna cable table includes an antenna id, a cable id and a length value for the cable. The cable id of the antenna cable table 252 is associated with a cable table 254 and corresponding cable id. The cable table 254 includes a cable ID, a cable name, and a loss per unit value which shows the cable power loss in decibels per foot. The antenna id of the antenna table 250 is also associated with the antennae connector table 256. The antennae connector table includes an antennae id corresponding to the antenna id number, a connector id, and a QTTY which is the number of connectors on the cable. The antennae connector table 256 is associated with a connector table 258. The connector table includes a connector id which corresponds with the connector id of the antennae connector table 256, a connector name, and a loss per unit value which shows the connector's power loss in decibels per unit for one connector.

Figure 3:
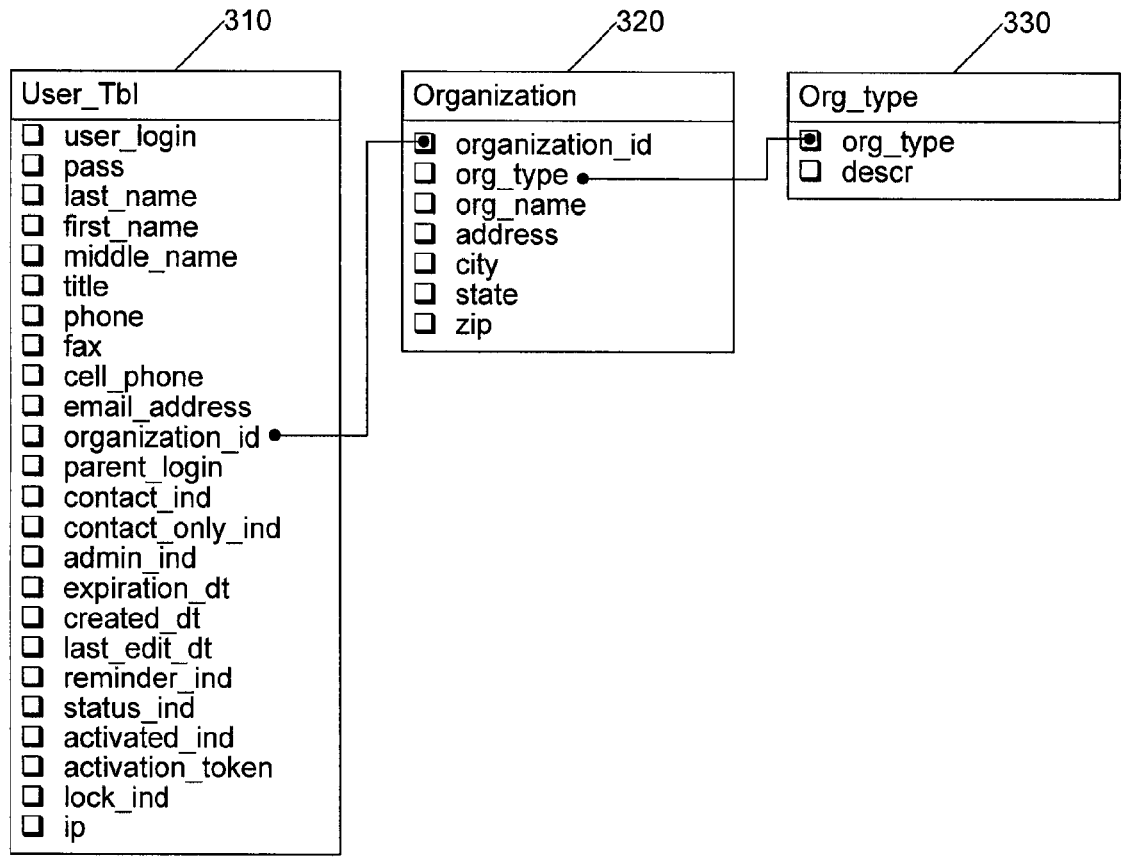
FIG. 3 is a database diagram or schema illustrating the schema for a user in an example system user database which can be implemented on the database server.

FIG. 3 is a database diagram or schema illustrating the schema for a user in an example system user database which can be implemented on the database server 124 of FIG. 1. The schema includes a user table 310, an organization table 320, and an organization-type table 330. The user table 310 includes a user log-in, a password, a last name, a first name, a middle name, a title, a phone number, a fax number, a cell phone, an e-mail address, an organization id, a parent log-in, a contact ind which indicates if 'user' data is used also for database contact information, a contact-only ind which indicates if 'user' data is used only for system contact information, and that the user does not have access to the System, an administration ind which indicates the system administration account, an expiration date, a creation date, a last edited date, a last accessed date, a reminder ind which will be described in more detail later, a status ind which will be described in more detail later, an activated ind which will be described in more detail later, an activation token (a unique number which is used during the account activation for security reasons), a lock IND (indicates if the user is "locked" to 1 IP address—user has access to the System only from one IP address) and an IP address.

The organization identification of the user table 310 is associated with an organization table 320. The organization table 320 includes an organization identification, an organization type (for example a wireless telecommunication company, city or municipality, or property management company), an organization name, address, city, state, and a zip code.

The organization type of the organization table 320 is associated with the organization type of the organization type table 330. The organization type table includes the organization type and a description of the organization.

Figure 4:
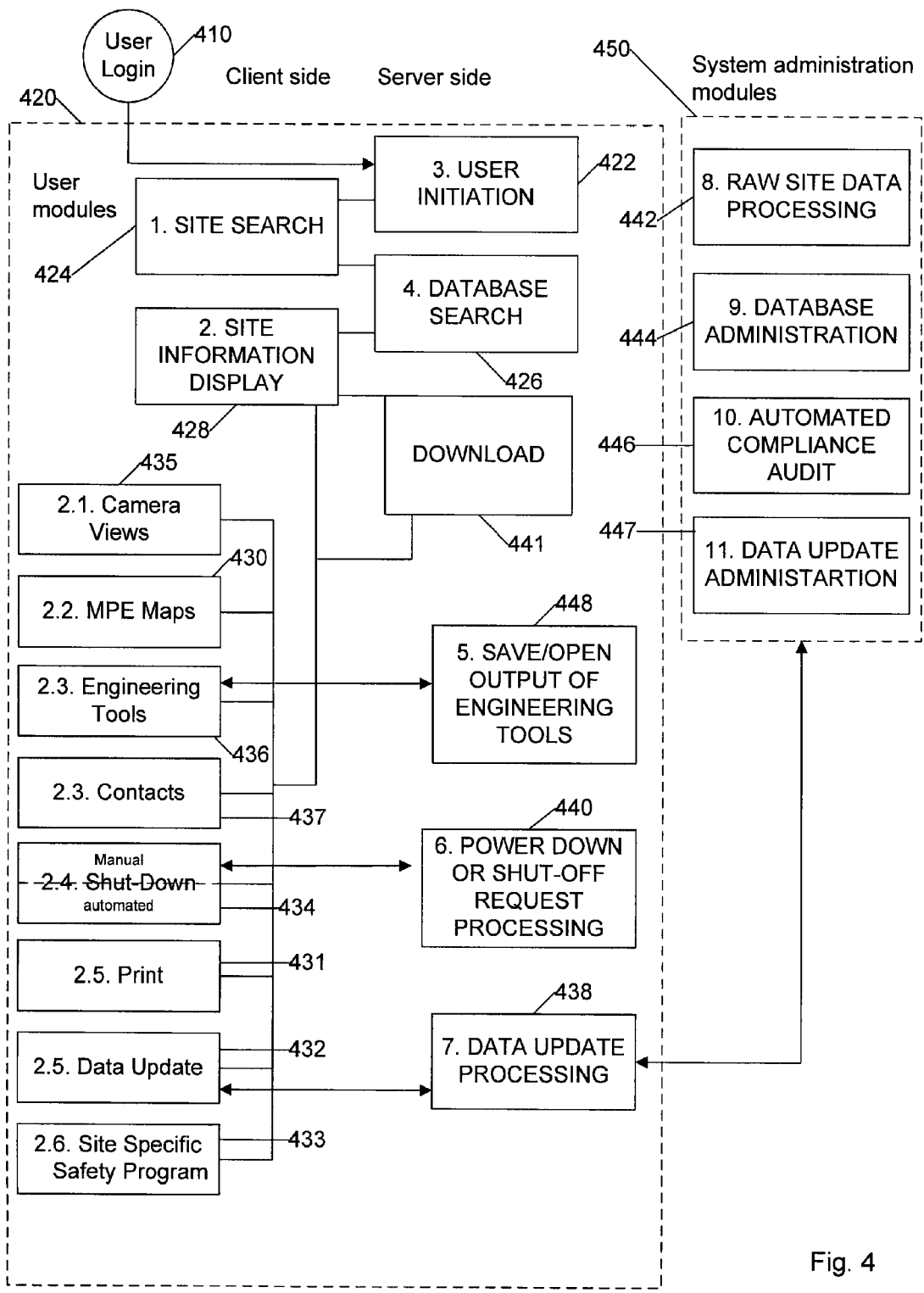
FIG. 4 is a functional block diagram illustrating the functions or modules of one embodiment of the system.

FIG. 4 is a functional block diagram illustrating the functions or modules of one embodiment of the System 100 of FIG. 1. The System includes user modules 420 and system administration modules 430. The user modules 420 provide the operational functionality of the System and the system administration modules provide the administration functionality. The user modules are divided into client side modules and server side modules. The client side modules generally provide the interface functionality for the user interaction. In one embodiment the client side modules run on a remote user computer FIG. 1 110(a-c) and provides a graphic interface to users. The Server side modules run on the server side on the web/application server FIG. 1 120, and interact with database servers 124 and send output to client side.

On the server side the user modules include a user initiation module 422, a database search module 426, a power down request processing module 440, a save/open output of engineering tools module 448 and a data update processing module. On the user side the user modules include a site search module 424, a site information display module 428, a camera view module 435, an MPE maps module 430, an engineering tools module 436, a contacts module 437, a power down request module 434, a print module 431, a data update module 432 and a site specific safety program module 433.

The user initiation module 422 implements the user logon function including determining whether the user has authorization to use the System and determining what rights the particular user has. The site search module 424 provides the functionality or interface for searching the database of sites. The user can use different search criteria or use more than one search criteria in their request. In one embodiment the search can criteria include the street address, city, county, state, zip code, RF check site code, Federal Communications Commission ("FCC") information, site number which is the FCC structure/tower registration number, APN site number, and latitude/longitude/range fields. A detailed description of the site search module 424 functions is provided in connection with FIG. 5 below.

Once the user provides the requested search criteria, the site search module 424 provides this information to the database search module 426 on the server side. The database search module 426 resides on web/application servers 120 and interacts with the database servers 124 of FIG. 1. The database search module 426 searches the data base using the search criteria and provides the results to the site search module.

The site information display module 428 provides the user with information about a specific site. In one embodiment, the site information display module shows the user the site top preview, the geographic map preview, the site panoramic view or a slideshow of the site's camera views and site information. The site top preview is generated from data in the database. In one embodiment a flash application ("FA") dynamically creates a site top preview map and shows a graphic representation of all site elements with the MPE maps. The geographic map preview can be generated using web services or stored images and displays sites on a geographic map. The module allows the user to click on a zoom button or the image itself and a zoomed map view is displayed with a dot that represents the site location. In one embodiment in order to generate the site panoramic view or slideshow of the site's camera views, the camera module 435 loads an external panoramic image of the site to a flash component allowing a simulation of the panoramic view and zoom, or slideshow of the site's camera views. For the site information the module displays site information which includes the items set forth in the site table of FIG. 2 (210). The module can vary the site information presented based on the type of user or rights of a user as set forth in the system user database.

From the site information display module 428 the user can choose to use the functions of the camera view module 435, the MPE map display module 430, the data update module 432, the power down request module 434, the engineering tools module 436, the contacts module 437, the print module 431 and the site specific safety program module 433. The site specific program module displays a site specific safety program to a user. This module also updates the site specific safety program when changes are made to a site. The functionality of this module is explained below in connection with FIG. 19.

The camera views module 435 loads and displays multiple types of camera site views. In one embodiment these views include top left, top right, lower left, and lower right. These views are retrieved from the data structure shown in FIG. 2. A user can select one of the views by clicking on the appropriate button. Once the appropriate button is selected the camera view of the site appears on the user's screen.

The MPE map display module 430 displays the sites antenna structures showing all the site's elements and the associated MPE maps. The module calculates and displays these items. A user may click on a particular antennae structure and the module opens a pop-up window showing MPE maps, two camera views of the chosen antennae structure (standard and zoom), and information about the antennae structure. In one embodiment, this enables any worker or individual visiting any wireless site in the United States to see the invisible occupational controlled and restricted RF patterns. These RF pattern maps can be updated on a daily basis and are an integral part of the System's compliance and safety solution.

The data update module 432 allows an authorized user (for example a representative of an organization that operates one or more sites) to edit data of the site antennas that are associated with the authorized user. The data update module also receives data from the wireless telecommunication company who owns the antenna. The module sends the edited data to the data update processing module 438. This data update processing is explained in more detail with FIG. 8 below. The data update processing module provides a site element preview map with selectable antennae structures. In one embodiment a click on an antenna structure displays the following information: antenna label, sector label, antenna structure label, antenna frequency (editable), antenna input power (editable), antenna type (editable), and antenna model (editable). A click on the antennae structure yields an antennae structure zoom view with various antennas each having a link to further screens. A click on a particular antennae yields information including the information set forth in FIG. 2 (250). The data update processing module communicates with the system administration modules 450. The data update module 432 provides the user with the ability to edit editable fields and send updates to the administrator.

Figure 7:
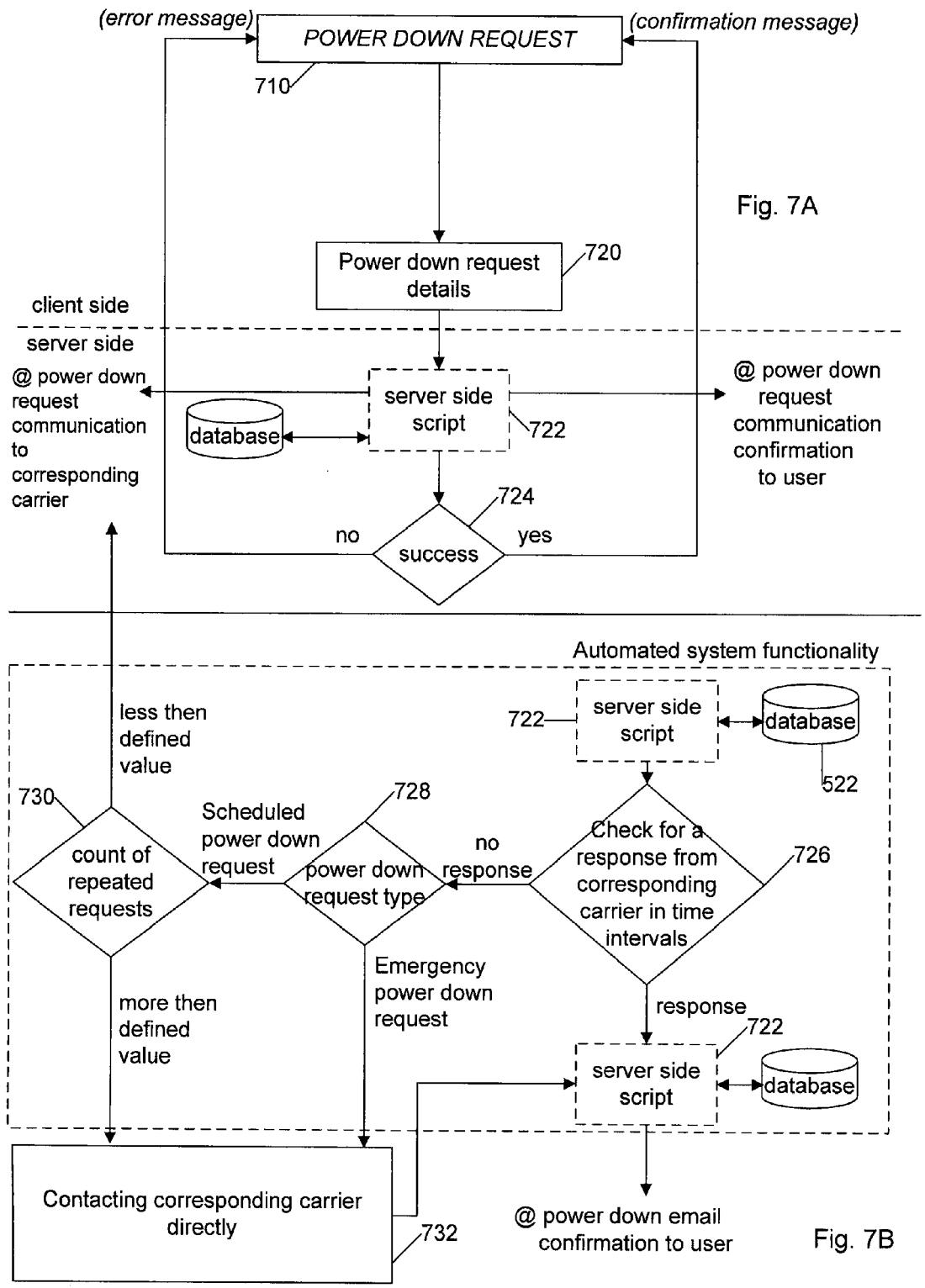
FIG. 7A is a flow diagram of the power down request functions.
FIG. 7B is a flow diagram of the functions performed once a power down request email is sent to the wireless telecommunications company.

The user can also move from the site information display module 428 to the power down request module 434. The power down request module allows the user to request that a particular site's or antenna structure at a sites power to be reduced or turned off. The power down request module 434 communicates with the power down request processing module 440. The power down module allows the user to send power down requests for one or multiple antenna structures from selected sites. The power down request is sent by email to the broadcaster (operator of the antenna) and a copy of that e-mail to the administrator, site owner, property management company and city or municipality associated with the site where the antenna structure resides. The power down processing module 440 creates a database entry about the power down request and sends confirmation to the user. The scheduled power down request allows the user to send scheduled power down request with information including reason for power down request, selected antenna structures, and date and duration in hours. The power down request has both a manual and automated power down function. A more detailed description of the functioning of the power down request processing module is set forth in connection with FIG. 7 below.

The engineering tools module 436 generates and provides an MPE map based on utilizing dynamic resident database information, and modified data. Utilizing the dynamic resident database information the engineering tools module 436 calculates power densities for antennas in the database including calculations for intermodulation, isolation and creation of a hypothetical site called a "try-out" site discussed in more detail in connection with FIG. 6. For the MPE map, the user can select any antennae from the site to view all information about the antennae. The user can manipulate some of the data to see how it affects the MPE maps. For intermodulation the module calculates the intermodulation between two selected antennas. For isolation the module calculates the isolation between the two selected antennas. The user can create try-out sites by placing a new antennas into the site to create a preview of MPE maps or calculate intermodulation and isolation. Intermodulation and isolation studies predict possible interference of radio frequencies transmitted from different antennas and provide important information about the isolation levels required for a compatible site environment. All of these processes will be explained in more detail with FIG. 6.

The contacts module 437 displays to the user contact information including site broadcasters, site owner, property management company and city municipalities. In one embodiment of a contact contains the following fields: company name, person name, title, phone, fax, cell phone, e-mail, address, city, zip and state.

The print module 431 provides the user the ability to print database outputs based on their selection. In one embodiment some of the items which can be printed are MPE maps for specific antenna structures, MPE maps for the whole site, camera view, contact information and a site safety program. Before access to the print functionality is allowed, a disclaimer pop-up window appears with specific verbiage acknowledging the importance of worker safety and limiting liability for the data provider. If only a black and white printer is available, the print module 431 creates a print output suitable for black and white print showing the graphic representation of MPE maps as crosshatched areas.

The system administration modules 450 include a raw site data processing module 442, a database administration module 444, an automated compliance audit module 446, and data update administration module 447. Data update administration module 447 sends reminders through notifying a defined contact to update actual attributes of the site. Periodic updates are necessary as there are frequent changes to the actual attributes of sites. The automated compliance audit module 446 provides functionality for database audits. It audits the sites which are controlled by the System on a monthly and annual basis to confirm that they are in compliance with International, Federal and State regulations, for example IEEE, FCC, and California OSHA. In one embodiment the data update administration module handles sending requests for data updates to the users ('out'), and when the user responds ('in') it evaluates updates.

The database administration module 444 includes the functions to manage the application users, manage site data, manage power down requests (set forth in FIG. 7A, 7B), and track application usage. In one embodiment the raw site data processing module 442 performs functions including converting raw data files into the format required by the database structure as seen in FIGS. 2 and 3, and checking the quality of data.

Figure 5:
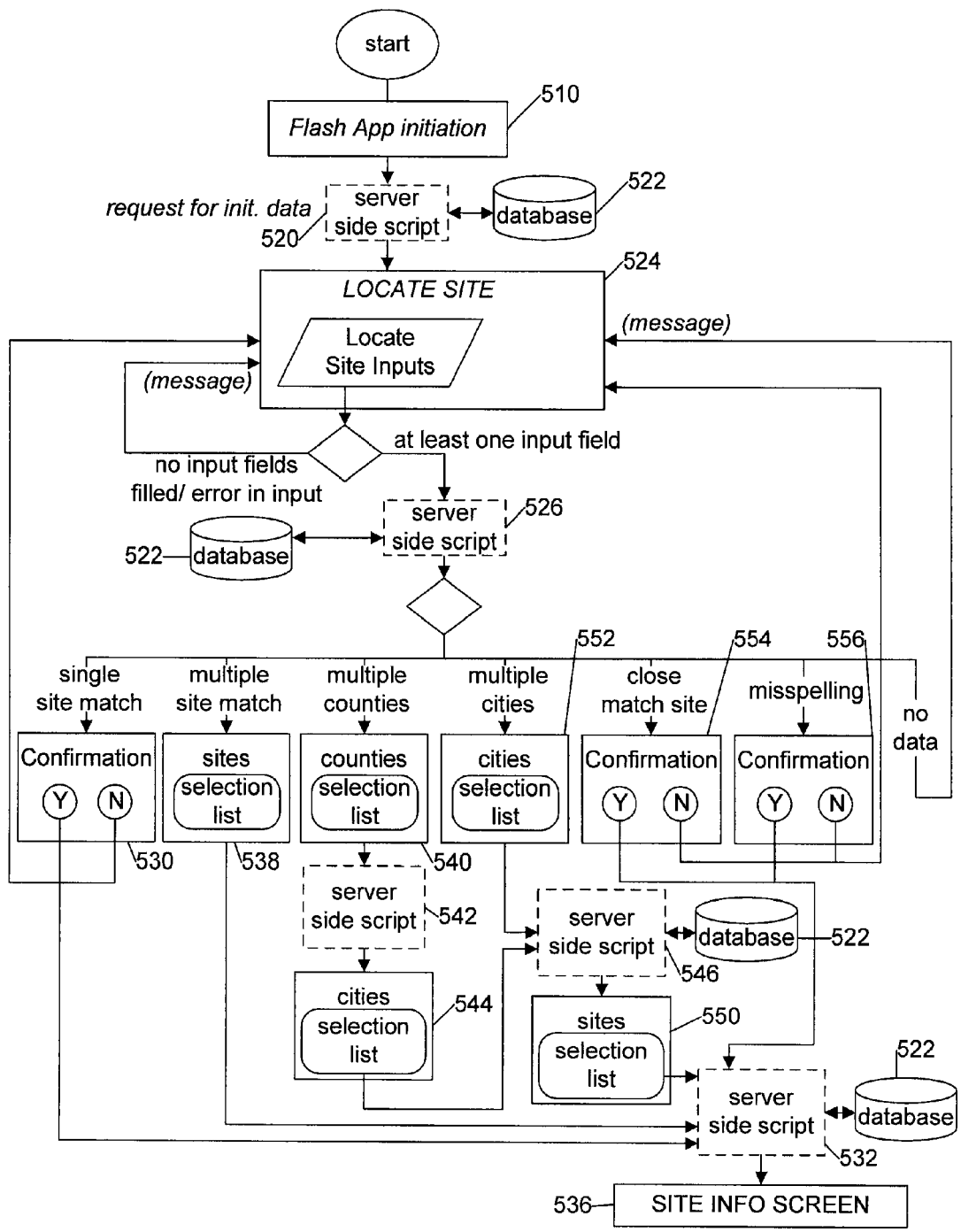
FIG. 5 is a flow diagram of the searching and display functions of the system.

FIG. 5 is a flow diagram of the searching and display functions of the System 100 of FIG. 1. The described process can be implemented by the corresponding modules depicted in FIG. 4. At step 510 an initiation screen 510 which allows the user to enter logon information is transmitted to the user. At step 520 the logon information is processed to determine the user's access rights and ability to logon. In one embodiment this is accomplished by a query to database 522. The database 522 can be implemented as the database servers 124 in FIG. 1 which can include the system user database depicted in FIG. 3 and the site database depicted in FIG. 2. Though reference is made to "sites" in this description, that refers to the representations of the sites in the database.

At step 524 a locate site interface is initiated for the user. The user can enter and transmit search criteria to create a search request to find a site at a certain geographic location. The type of criteria the user can enter and other limitations on the search can be implemented based upon the user's rights. For example, a user's access can be limited geographically or by ownership or operation of a site. The user can enter one or more of the various search criteria which were set forth in FIG. 2 above.

At step 526 the criteria entered by the user, in the form of a search query, is processed, for example by the database 522. The database 522 analyzes the search criteria and matches them with the geographic sites which are in the database. Depending on the type of query and the user's rights, the process then proceeds to one of steps 530, 538, 540, 552, 554, or 556.

If the query processing in step 526 results in a single site match, the process continues to step 530. The query processing step has the ability to provide approximate site matches based on the parameters entered by the user. A close site match would be defined as a match that provides the user with the same output as a single site match. At step 530 an interface is transmitted which displays the results and prompts the user to accept the results or request a new search. If the indicated site is not the site that the user was looking for, the confirmation step sends the user back to the location site step 524 where they can input different site criteria. If the user accepts the identified site the process proceeds to step 532.

If the query processing in step 526 results in a multiple site matches the process continues to step 538 where an interface is transmitted to the user which indicates the results and prompts the user to chose from the multiple site. Once the user's choice of a site is received, the process proceeds to step 532.

If the query processing in step 526 results in a listing of multiple counties where sites matching the criteria entered by the user could be located, the process proceeds to step 540. At step 540 an interface is transmitted which allows the user to choose a county. The process then continues to step 542 where the county information entered by the user is compared to the database 522 and a list of cities is generated. The process then continues to step 544 when an interface is transmitted indicating the city results and prompting the user to chose from the cities. Once the user chooses a city the process proceeds to step 546. At step 546 the criteria and the city entered by the user, in the form of a search query is processed, for example by the database 522. The database 522 analyzes the search criteria and matches them with the site data. At step 550 an interface is transmitted which includes a list of the sites and allows the user to select a site from the list. The process then proceeds to step 532.

If the query processing in step 526 results in a listing of multiple cities where sites matching the criteria entered by the user could be located, the process proceeds to step 552. At step 552 an interface is transmitted which allows the user to choose a city. Once the user chooses a city the process proceeds to step 546, which has been previously described.

If the query processing in step 526 results in a close site match the process continues to step 554 where an interface is transmitted to the user which indicates the results and prompts the user to accept the results or request a new search. For example, if the indicated site is not the site that the user was looking for, the confirmation step sends the user back to the location site step 524 where they can input different site criteria. If the user accepts the identified site the process proceeds to step 532.

If the query processing in step 526 contains misspellings and a close site match is found the process continues to step 556 where an interface is transmitted to the user which indicates the results based on correction of misspelled search input and prompts the user to accept the results or request a new search. For example, if the indicated site is not the site that the user was looking for, the confirmation step sends the user back to the location site step 524 where they can input different site criteria. If the user accepts the identified site the process proceeds to step 532.

At step 532 the site selected by the user is sent to the database 522 where the data associated with this site is obtained. At step 536 an interface with the site information allows the user to access additional functions discussed in connection with modules 435, 430, 436, 437, 454, 431, and 432 of FIG. 4. In one embodiment this step is performed by the site information display module 428 of FIG. 4.

In one embodiment the interface with the site information is presented as a site top view preview map with all the site's elements based on the database data. This includes MPE maps, dimensions of the site, and dimensions of the MPE areas. Antenna structure pop-up window shows detailed information about the antenna including MPE horizontal view with buttons allowing the user to switch between antenna arrays, MPE map vertical view with buttons allowing the user to switch between antenna sectors, antenna structure camera views including both standard and close view options, and antenna structure information. In one embodiment antenna structure information can include the antenna structure type, latitude/longitude of the antenna structure, list of antenna arrays with labels and elevations, list of antenna sectors for all antenna arrays with labels and azimuths, and list of all antenna for one antenna sector with label, frequency, power, antenna type, and model.

In one embodiment the site information module 428 also allows the user to filter sites by power line types (high power lines, low power lines, restricted), print information related to RF safety for specific pole numbers, and create an interactive map. The interactive map function allows the user to 'move' along the power lines on an interactive map to locate another site on the same power line. The interactive map displays clickable arrows in the direction of the power line, a click on these arrows moves toward the location, the sites are shown by a dot, a click on a site dot displays information about the site.

Figure 6:
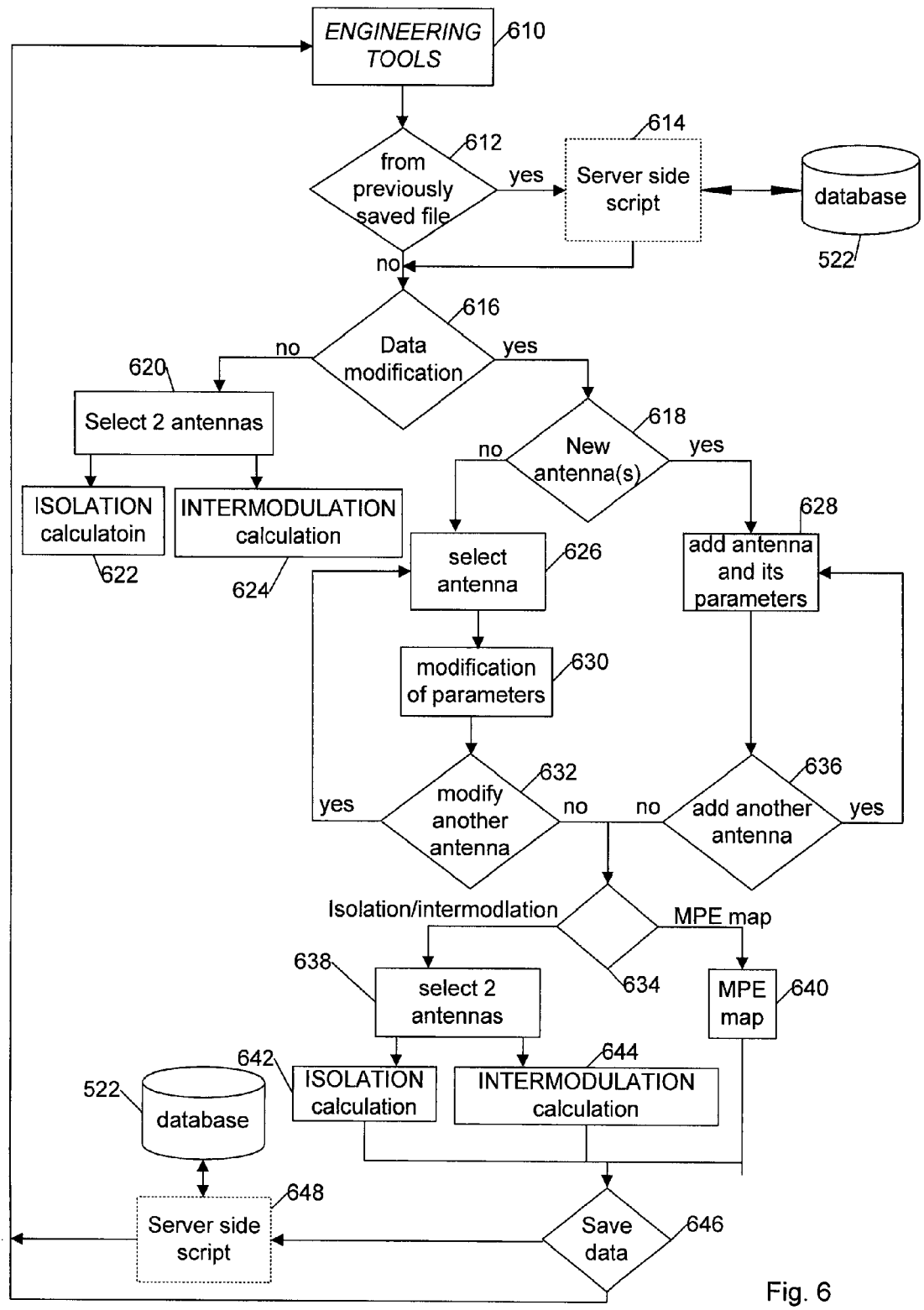
FIG. 6 is a flow diagram of one embodiment of the process implemented by the engineering tools module.

FIG. 6 is a flow diagram of one embodiment of the process implemented by the engineering tools module 436 of FIG. 4. In one embodiment functions of the engineering tools module include generating MPE maps based on modified data, calculating intermodulation between selected antennas, calculating isolation between selected antennas and the ability to create a "try-out" site. The "try-out" option provides the user with the ability to place hypothetical new antennas into an existing site, MPE maps and other calculations can then be performed.

Referring to FIG. 6 the user enters the engineering tools at step 610. At step 610 the user can choose a previously saved file or choose to create a new file, which in one embodiment could be a "try-out" site. If the user selects a previously saved file the process proceeds to step 614. At step 614 the information from the previously saved file is retrieved. In one embodiment this is accomplished by a query to the database 522.

Whether a previously saved file is retrieved or not, the process proceeds to step 616. At step 616 the user can select to analyze existing data or modify data. If the user elects to use existing data, the process proceeds to step 620. At step 620 the System allows the user to select two antennas at the site. At step 622 the isolation between the antennas selected by the user in step 620 is calculated. At step 624 the intermodulation between the antennas selected by the user in step 620 is calculated.

If the user elects to modify data at step 616, the method proceeds to step 618. At step 618 an interface provides the user with an option to choose new or existing antennas. If the user chooses the existing antenna option the process proceeds to step 626 which provides the user an option of selecting an antenna. At step 630 the System provides the user with the ability to modify the parameters of the antenna selected in step 626. Next the process provides the user with the ability to chose to modify another antenna at step 632 or proceed to the function steps. If the user chooses to modify another antenna the process returns to step 626. If the user chooses not to modify another antenna the process proceeds to step 634. If the user chooses a new antenna at step 618 the System proceeds to step 628. At step 628 the process provides the user with the ability to add (or create) an antenna and its antenna parameters.

In one embodiment the adding or creation of an antenna is performed by providing the user with lists of choices from a database. For example, the process can begin with a list of antennas and then proceed to the lists of characteristics associated with the selected antenna. The selections are stored in a file which represents the created antenna. Once the user is finished selecting the parameters for the antenna, the process proceeds to step 636. At step 636 the process provides the user with the ability to choose to add another antenna or proceed to the calculation steps. If the user chooses to add another antenna the process returns to step 628.

In one embodiment at step 634 an interface is transmitted which allows the user to choose to either perform isolation/intermodulation calculations or create an MPE map. If the user chooses isolation/intermodulation the process proceeds to step 638. At step 638 the process provides the user with the ability to select two antennas which includes my antennas created by the user. Once two antennas are selected, the process provides the user with the ability to proceed to either step 642 to calculate isolation between the two selected antennas or to step 644 to calculate intermodulation between the two selected antennas. If the user chooses the MPE map step, the process proceeds to step 640 where an MPE map is created based upon the characteristics of the antenna. At step 646 the calculations performed by the System or the MPE maps created can be saved. At step 648 the information is saved into the database 522.

Referring back to FIG. 5, at the site information step 536, or FIG. 4 module 428 the user can access the functions in the contacts module 437 shown in FIG. 4. The System provides the user with a contacts module. At step 536 of FIG. 5 the System provides the user the option to go to the power down request module 434 of FIG. 4.

FIG. 7A is a flow diagram of the power down request functions which can be implemented by modules 434 and 440 of FIG. 4. At step 710 a power down request interface provides the user with the ability to send a power down request for one or multiple antenna structures from a selected site. At step 720 the process provides the user with the ability to enter details relating to the power down request. At Step 722 a power down request email is generated and sent to the broadcaster associated with the antenna, and a confirmation email about sending the power down request is sent to the user, and then a database record about power down request is created. At step 724 if the power down is successful a screen is displayed at 710 stating the emails have been successfully sent.

FIG. 7B is a flow diagram of the functions performed once a power down request email is sent to the wireless telecommunications company. This request is sent automatically by database administration module 444 FIG. 4. At Step 726 at predetermined time intervals a check is carried out to determine if a response from the wireless telecommunication company has been received. If a response is received from the wireless telecommunication company the process proceeds to step 722. At step 722 the response is saved in the database. At step 722 a power down email confirmation is also sent to the user to confirm that the wireless telecommunication company received the power down request. This email may also contain further power down request information. If step 726 determines that no response has been received from the wireless telecommunication company the process proceeds to step 728. Step 728 determines what type of power down request has been sent. In one embodiment the types of power down requests include scheduled and emergency. If the power down request is determined to be an emergency the process proceeds to step 732. At Step 732 the system administrator contacts the wireless telecommunication company directly and notifies them that the antenna structure must be shut down. If the power down request is a scheduled power down the process proceeds to step 730. Step 730 determines the number of repeated power down requests which have been sent to the wireless telecommunication company. If step 730 determines that less than a defined value of repeated power down requests have been sent, step 730 sends another power down request email to the wireless telecommunication company. If step 730 determines that more than a defined value of repeated power down requests have been sent, the system proceeds to step 732. If the system administrator contacted the wireless telecommunication company successfully the system proceeds to step 722, as if the response was received from the wireless telecommunication company.

Figure 8:
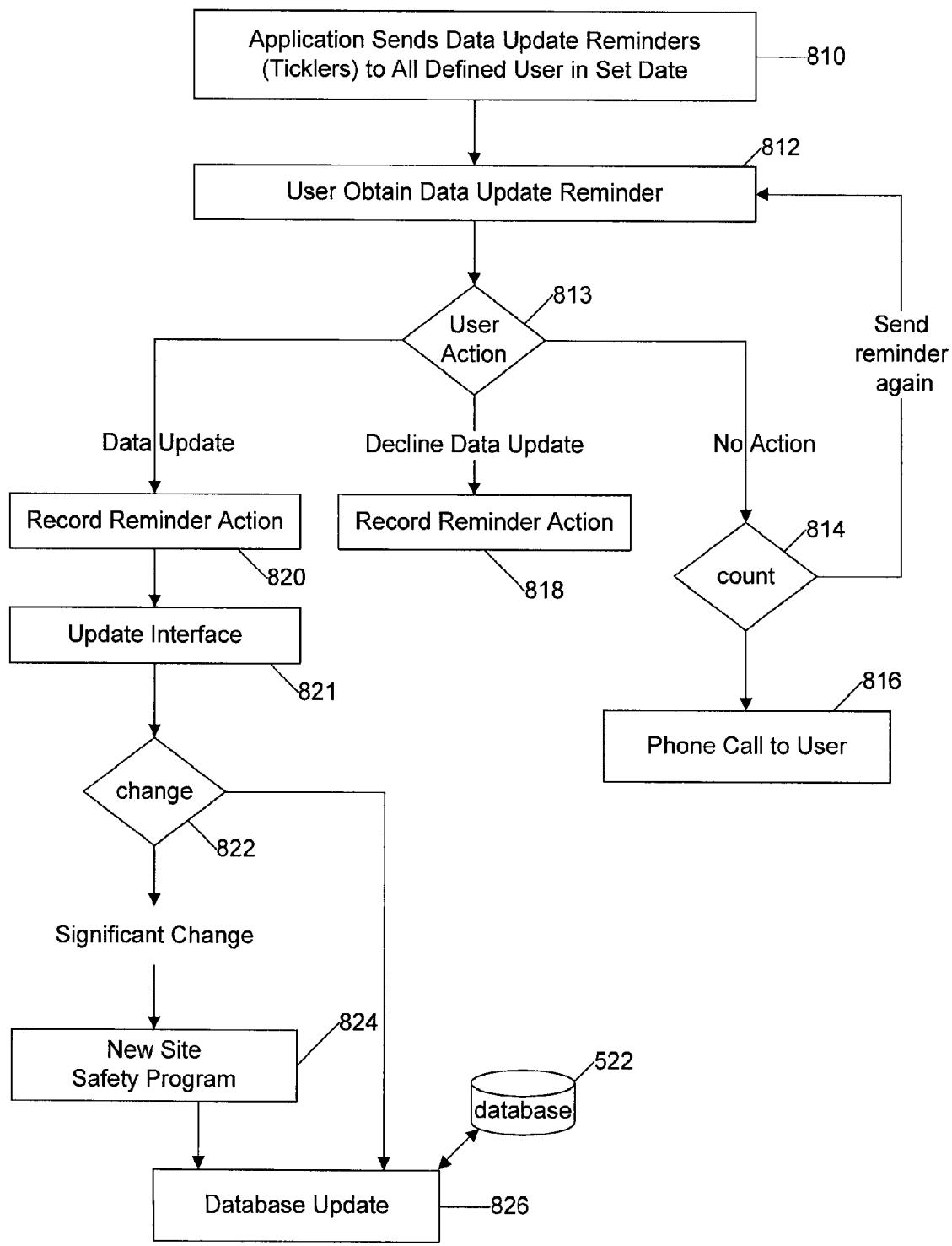
FIG. 8 is a flow diagram of one embodiment of the process implemented by the data update module.

FIG. 8 is a flow diagram of one embodiment of the process implemented by the data update administration module 447 of FIG. 4. At step 810 data update reminders are sent to all defined users. Defined users and their entered information is obtained from the user database and email reminders are transmitted to each such user. At step 812 the email displays a data update reminder to the user. At step 813 the user can select from action choices including data update or decline data update. If the user chooses the data update function the module routes them to step 820 where the user action, in this embodiment, database update, is "recorded", in the database. At step 821 the user is provided with an interface for making the update. In one embodiment this interface is made through module 432 of FIG. 4. The quality of the data is checked and the process continues to step 822 where the System verifies any significant change of the data that could affect site's specific safety program. If there is any significant change, a new site safety program is created by module 824. At step 826 the module stores the information, in the database. After receiving a response from the server side script, a screen displays information about success of update.

At step 813 if the user declines to update the data, the process proceeds to step 818. At step 818 the user's action, in this case decline the database update is "recorded" in the database. At step 813 if the user takes no action the process proceeds to step 814. At step 814 the process either sends a second reminder or generates a prompt for an administrator to contact the wireless telecommunication company by telephone or other means. This choice based on the number of times the process has received no action from the user.

FIGS. 9 A and B are a graphical representation of a physical site 900 and a generalized site data structure. FIG. 9 is intended to clarify the relationship between the data structure depicted more completely in FIG. 2 and a physical site that can be represented by the data structure. Each site 900 (represented as element 210 in the data structure) may include one or more (generally indicated by the notation "(n)") antenna structures 910 (represented as element 220 in the data structure). Each antenna structure may include one or more towers 914 (represented as element 930 in the data structure) and each antenna structure may further include one or more arrays 916a-c (represented as element 932 in the data structure). Each array can include one or more sectors 920 (represented as element 934 in the data structure) and each sector may include one or more antennas 918 (represented as element 936 in the data structure).

Figure 10:
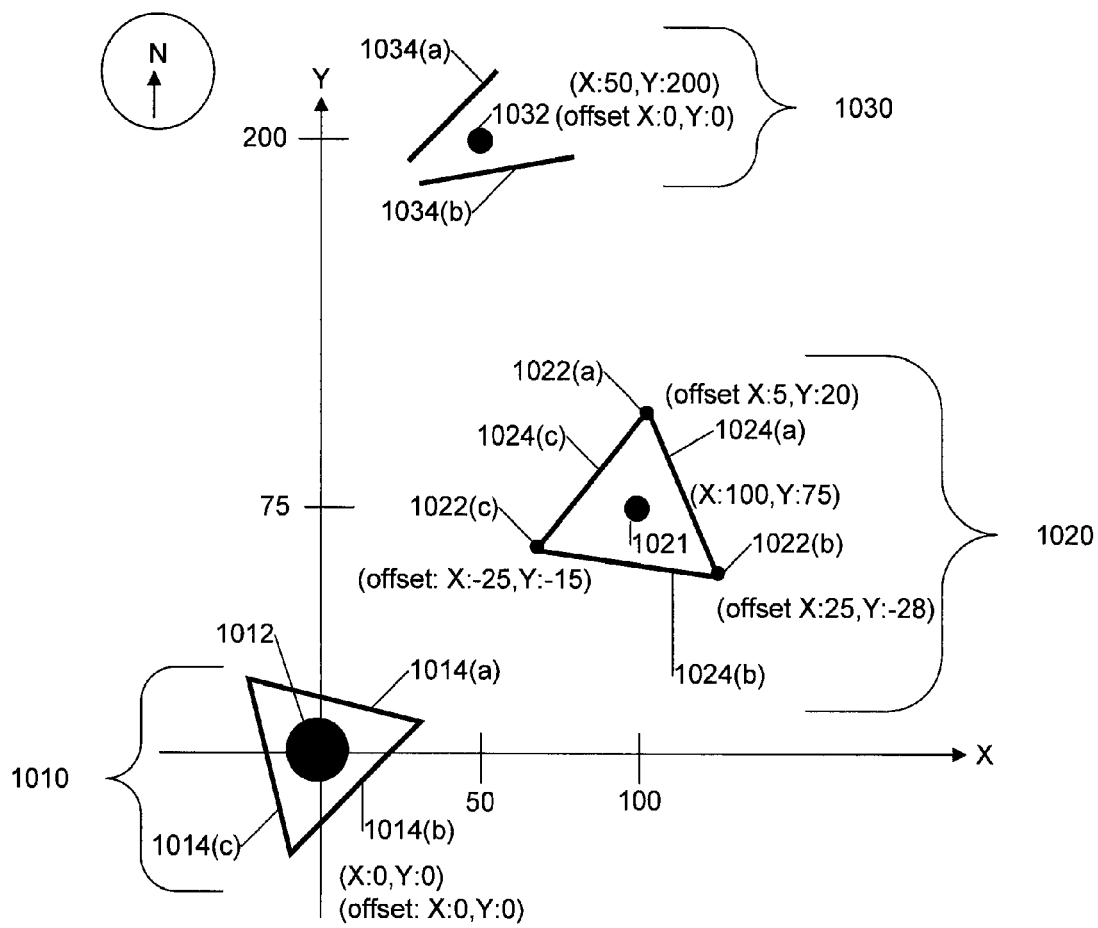
FIG. 10 is a graphical representation of a system which can be employed to define the spatial relationships between multiple antenna structures at a site which are stored in the database.
Figure 11:
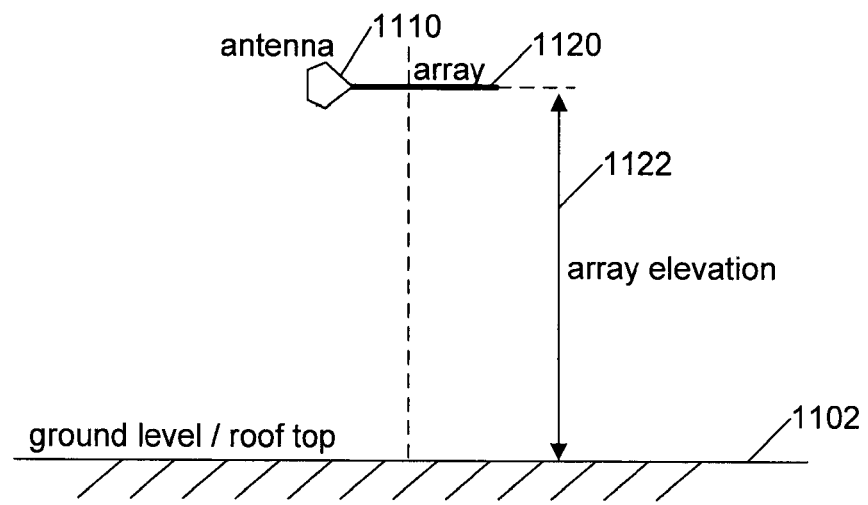
FIG. 11 is a graphical representation of an antenna with an associated array.
Figure 12:
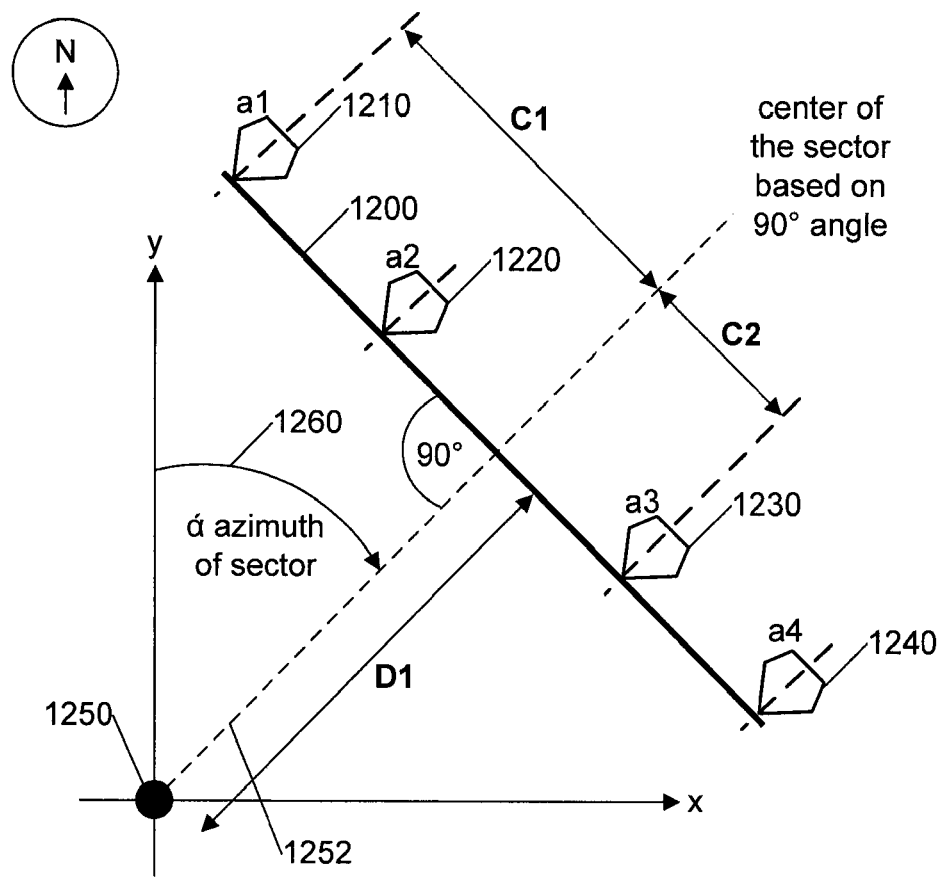
FIG. 12 is a graphical representation of one sector of an antenna structure with four associated antennas.

FIGS. 10, 11 and 12 will now be described in connection with one embodiment of a System used to define the spatial relationships between elements of a site.

FIG. 10 is a graphical representation of a system which can be employed to define the spatial relationships in a horizontal plane between multiple antenna structures at a site which are stored in the database. In the example depicted in FIG. 10 three different antenna structures 1010, 1020, and 1030 are located at one site. Antenna structure 1010 has one associated tower 1012 and three sectors 1014(a), 1014(b) and 1014(c). Antenna structure 1020 has three associated towers 1022(a), 1022(b), and 1022(c), and three sectors 1024(a), 1024(b) and 1024(c). Antenna structure 1030 has one associated tower and two associated sectors 1034(a) and 1034(b). These antenna structures are mapped on an X, Y coordinate system. The first antenna structure 1010 is defined as the base location and has the coordinates of X:0 and Y:0. The coordinates of the remaining antenna structures at the site are defined relative to the first antenna structure. The amount of precision in the coordinates may be selected based upon the measurement technique employed and the precision desired in any calculations which use the coordinates.

The location of antenna structure 1020 is defined in relation to antenna structure 1010. Each tower associated with the antenna structure receives a location value measured relative to its antenna structure location. In the example portrayed in FIG. 10, (Top view) antenna structure 1020 has coordinates X:100 and Y:75 measured from the center of the antenna structure 1020 in relation to the center of antenna structure 1010. This value corresponds to the database antenna structure table 220 of FIG. 2. In one embodiment the locations of towers of an antenna structure are defined as an offset from the location of associated antenna structure. For example, the towers associated with antenna structure 1020 have the following values in relation to the center of the antenna structure. Tower 1022(a) has an x offset of 5 and a y offset of 20, tower 1022(b) has a x offset of 25 and a y offset of −28 (the offset is measured from the center of the antenna 1021 as such when the tower is left or down from the antenna structure center, the values are negative) and tower 1022(c) has a x offset of −25 and a y offset of −15. These values correspond to elements in the database tower table 224 of FIG. 2. The coordinates and offsets for the other antenna structures and towers are shown in the figure.

FIG. 11 is a graphical representation (Side view—vertical plane) of an antenna with an associated array. In this representation the antenna 1110 and associated array 1120 are in a plane horizontal to the ground level or rooftop 1102. The distance between 1102 and 1120 is entitled the array elevation 1122. The array elevation is measured as the Z value element. This value is kept in the database 230 of FIG. 2B for each array.

FIG. 12 is a graphical representation of one sector 1200 (top view—horizontal plane) of an antenna structure with four associated antennas 1210, 1220, 1230 and 1240. D1 represents the distance from the center of the sector to the center of the antenna structure 1250 where the center line 1252 intersects the sector at a 90 degree angle. The azimuth is the orientation of the sector in a horizontal plane. The azimuth 1260 of the sector is the angle between the y axis (always pointing to the North) (see, FIG. 10) and the center line 1252. Note that unless the antenna structure 1250 is the antenna structure defined as the base for the site, the x and y coordinates shown in FIG. 12 are for the offset from the center of the structure and are not the primary coordinates X and Y. Every antenna structure has its own coordinate system with 0,0 at the center of the antenna structure. The y axis is oriented with a reference direction always pointing to the North. Each antenna on the sector has an associated horizontal distance from the center line (e.g., C1 and C2 for antennas a1 and a3 respectively). Those values are stored in the database table 250 of FIG. 2B.

The MPE maps module 430 calculates power densities for antennas in the database and creates graphic representations of the power densities. Example representations are depicted in FIGS. 13 and 14 described below. In one embodiment, the graphic representations are in the form of radiation pattern maps. In one embodiment the radiation pattern maps graphically depict the power densities and physical landmarks, for example towers and emitters. The calculations of power density and the creation of graphic representations of the densities can be used to determine and maintain site safety and to comply with government regulations (e.g., OSHA and FCC regulations) and to comply with other safety standards.

The graphic representations of MPE maps provide the user with projected gradation patterns of power density. In one embodiment, the maps show two distinct areas, restricted and controlled MPE areas, which are defined in one example by FCC/OSHA standards. MPE maps for the controlled areas represent the areas where the power density of the RF fields exceeds the limits for the general population. MPE maps for the restricted areas represent the areas where the power density of the RF fields exceeds the occupational MPE limits. The power density in the controlled areas is above the general public limits but not above the occupational limits for RF trained workers. However, more than two areas or regions can be defined and displayed. In general, the MPE maps module can display various gradation distinctions based on selected density values. The power densities created by multiple antenna structures in some instances owned by different wireless telecommunication companies can be generated to show cumulative density. Alternatively, these modules can be used to calculate all power densities for a site. This is extremely beneficial if a person needs to do maintenance at a site so that they can determine how far from each antenna structure they must remain in order to be at a safe distance.

Figure 15:
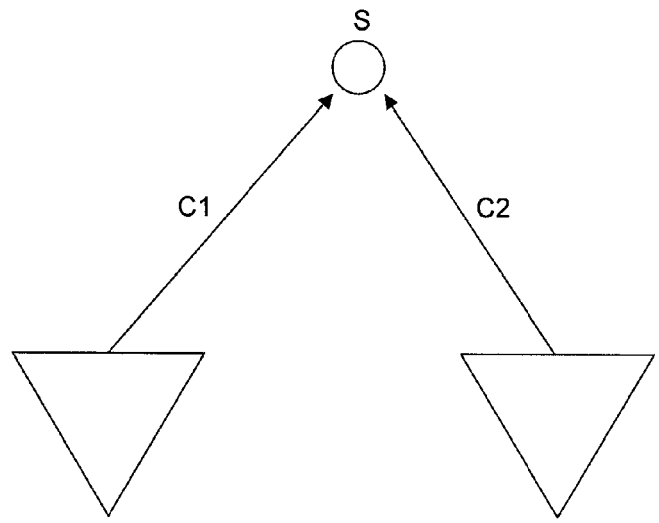
FIG. 15 represents the power density as a contribution of two antenna radiations.
Figure 17:
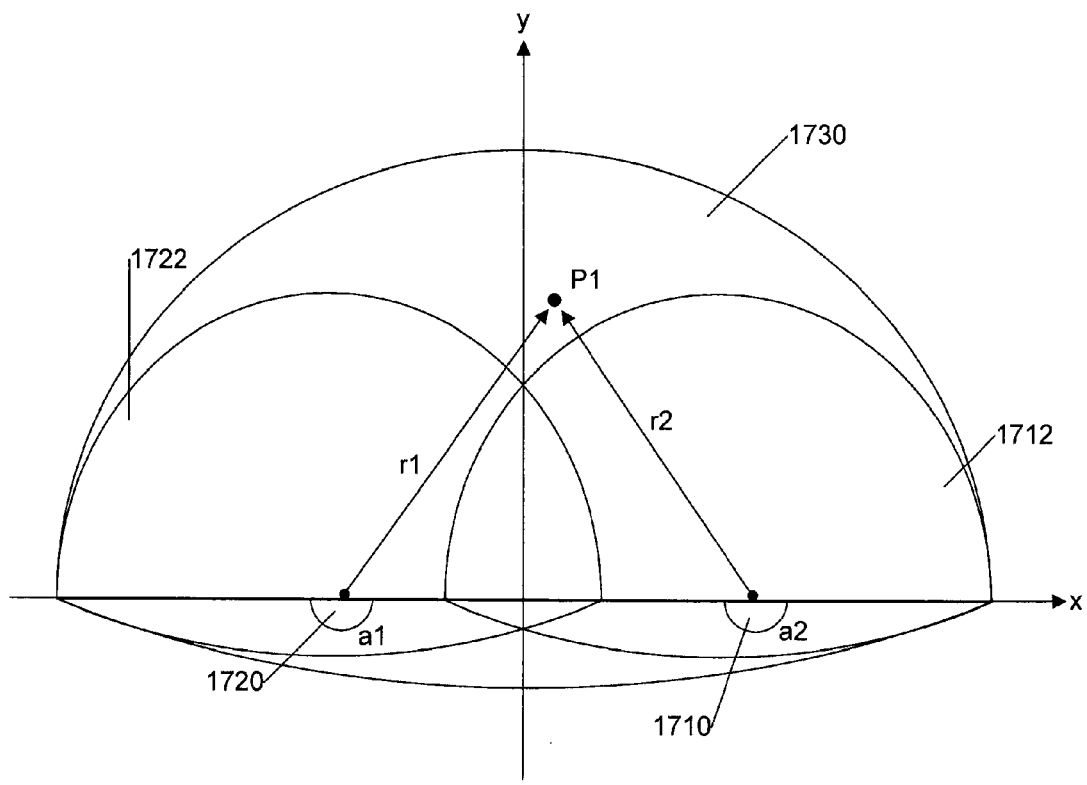
FIG. 17 represents the power density contribution of two antennas to a point in space.
Figure 18:
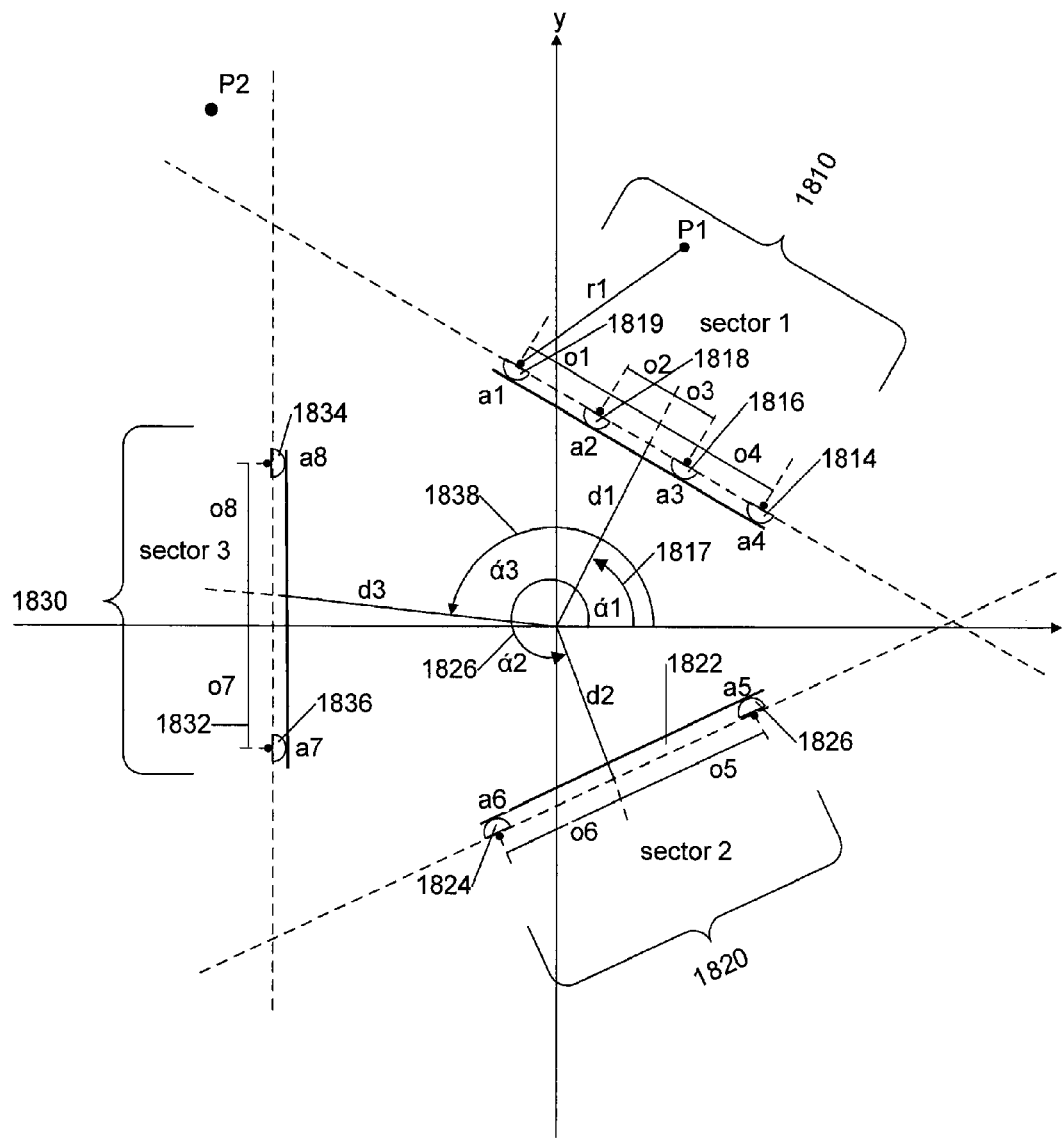
FIG. 18 represents participation of multiple antennas in the contribution model applied to an antenna array.

In one embodiment the MPE maps graphic representations and the power density calculations for antenna structures with multiple antennas can be determined using a single antenna model (FIG. 13B), conservative model (13 A) or the contribution model (FIGS. 15, 17 and 18). The conservative model considers one antenna sector as one antenna with power equal to the sum of the power of all antennas in the sector. The conservative model can be used in situations where it is not possible to calculate the individual contribution of the antennas and where it is not certain if the antennas are used as a transmitter or receiver. The contribution model creates a more accurate graphic representation of the MPE maps by calculating the contribution of each of the antennas in the sector.

Some example equations used to calculate power density which can be used for MPE maps are set forth below. In one embodiment the MPE map module 430 FIG. 4 can calculate power density for a variety of different antennas through the use of applicable mathematical models which have been enhanced by field measurement results stored in the data base. In one embodiment this includes non-circular directional antennas, and omni-directional antennas. Two equations are used for non-circular directional antennas. Equation number 1, set forth below, is used to calculate the power density close to the antenna. Equation number 2, set forth below, calculates the power density farther from the antenna.

$$S = \left(\frac{180}{\theta_{BW}}\right)\frac{P_{net}}{\pi Rh} = \left(\frac{180}{\theta_{BW}}\right)\frac{1.64 \cdot ERP \cdot \tau}{\pi Rh} \quad\quad 1$$

$$S = \frac{EIRP \cdot \tau}{4\pi R^2} = \frac{1.64 \cdot ERP \cdot \tau}{4\pi R^2} = \frac{0.41 \cdot ERP \cdot \tau}{\pi R^2} \quad\quad 2$$

Where:

S=power density (in mW/cm2)

Pnet=net power input to the antenna (in mW)=1.64*ERP*τ (calculated from ERP stored in the antenna table 250 of FIG. 2 as total input power)

θBW=beam width of the antenna (in degrees) which is the vertical beam width and horizontal beam (stored in the antenna model table 260 of FIG. 2)

ERP=effective radiated power (in mW) which is the input power represented in the antenna table 250 of FIG. 2

R=distance from the antenna (in cm)

H=aperture height of the antenna (in cm) which is the max dimension represented in the antenna model table 260 of FIG. 2

τ—ground reflection: τ=2.56 (for elevation=<1 m), τ=1 (for elevation>10 m) which is the elevation of the antenna, inherited from array location z in the array table 230 of FIG. 2

EIRP=equivalent (or effective) isotropically radiated power (in mW)=1.64*P.

To determine what antenna is considered "close" and "far" R needs to be determined. Equation no. 3 below sets forth the calculation of R.

$$\left(\frac{180}{\theta_{BW}}\right)\frac{P_{net}}{\pi Rh} = \frac{EIRP}{4\pi R^2} \text{(assuming that } EIRP = P_{net}\text{)} \quad\quad 3$$

Result equation:

$$R_{close} = \frac{\theta_{BW} h}{720}$$

Equation no. 1 and no. 2 are used with antennas which have no ground reflection (antenna elevation>10 m).

To calculate antenna with ground reflection (antenna elevation=<10 m equation no. 4 is used.

$$S = \frac{2.56 \, EIRP}{4\pi R^2}(OET65, \text{ page 21, equation 7}) \quad\quad 4$$

and $$S = \left(\frac{180}{\theta_{BW}}\right)\frac{P_{net} \cdot 2.56}{\pi Rh}$$

In order to calculate the power density for omni-directional antenna, equation 5 is used.

$$S = \left(\frac{180}{\theta_{BW}}\right)\frac{P_{net}}{\pi Rh} = \left(\frac{180}{\theta_{BW}}\right)\frac{1.64 \cdot ERP \cdot \tau}{\pi Rh}. \quad\quad 5$$

for power density "close" to antenna

The MPE maps module 436 as represented in FIG. 4 provides radiation pattern maps which show the power density limits for restricted, controlled and general public MPE boundaries. The radiation pattern maps depicted in FIGS. 13 and 14 show two different levels of density based on the exposure limit ranges set forth in the following tables:

| Controlled Exposure (limits for occupational) ||
| --- | --- |
| Frequency Range (MH$_z$) | Power Density (S) mW/cm$^2$ |
| 30-300 | 1.0 |
| 300-1,500 | f/300 |
| 1,500-100,000 | 5.0 |

| General Public Exposure (limits for general population) ||
| --- | --- |
| Frequency Range (MH$_z$) | Power Density (S) mW/cm$^2$ |
| 30-300 | 0.2 |
| 300-1,500 | f/1500 |
| 1,500-100,000 | 1.0 |

Figure 13A:
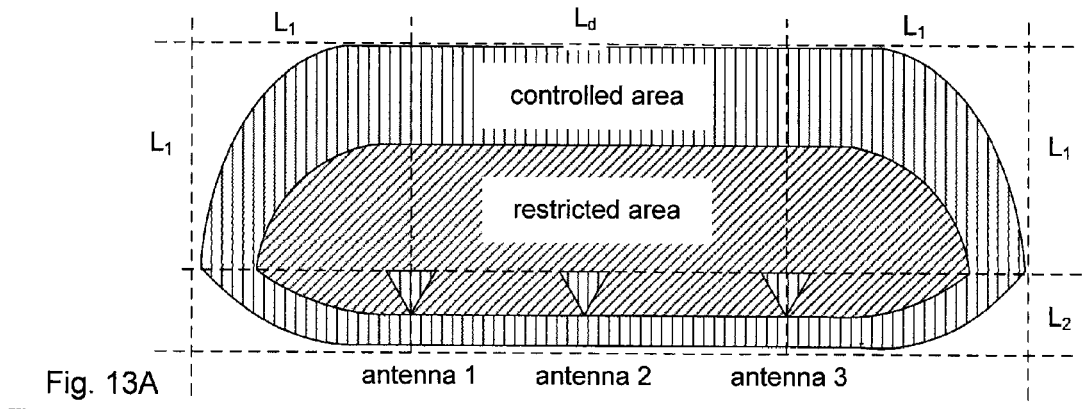
FIG. 13A is a graphical representation of a MPE map from the top view perspective for three antennas with overlapping controlled and restricted areas represented.
Figure 13B:
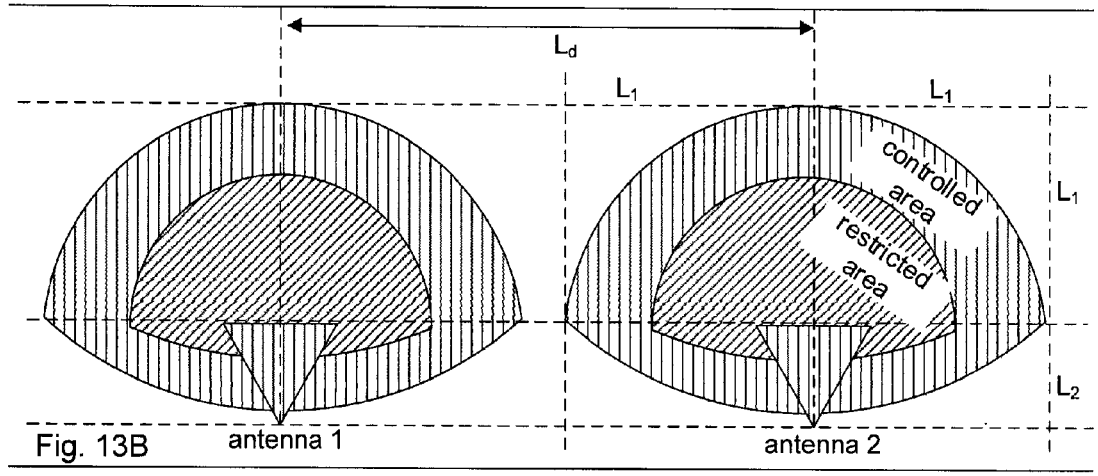
FIG. 13B is a graphical representation of a MPE map from the top view perspective for two antennas with non-overlapping controlled and restricted areas represented.
Figure 13C:
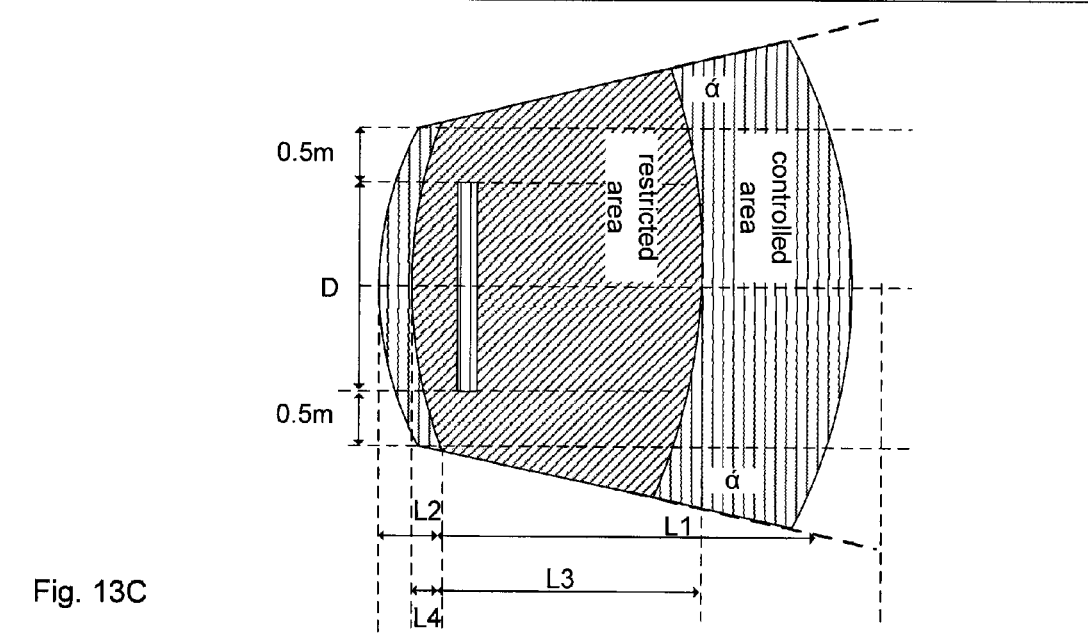
FIG. 13C is a graphical representation of a MPE map from the side view perspective of an antenna.

13A is a graphical representation of a MPE map from the top view perspective for three antennas with overlapping controlled and restricted areas represented. In one embodiment, these gradations include the occupational RF "restricted" and "controlled" areas based on the MPE limits. FIG. 13A is a top view for three antennas or transmitters with overlapping controlled and restricted MPE regions. FIG. 13B is a graphical representation of a MPE map from the top view perspective for two antennas with non-overlapping controlled and restricted areas represented, and where a single antenna mathematical model was applied. FIG. 13C is an example of a side view of an antenna as represented in FIG. 13A or 13B. In these figures, L1 is the extent of the controlled areas which is the distance in which power density reaches its limits for general public MPE. L2 is the extent of the controlled area on the back of the beam and equals L1 multiplied by the front-to-back FB ratio from database table antenna model 260. The front-to-back ratio stored in the database table 260 is obtained from the manufacturer's technical specification. L3 is the distance in which the power density reaches its limits for controlled MPE. L4=L3 multiplied by the front-to-back ratio. Ld is the distance between the center of the antennas furthest apart. D is the height of the antenna.

FIG. 14 is a graphical representation of a MPE map of an omni-directional antenna from the top and side view perspective. This figure utilizes the same values which were defined in connection with FIG. 13 except h in FIG. 14=D in FIG. 13.

FIG. 15 represents the power density which is created as a contribution of two antennas. C1 represents the contribution from antenna 1, C2 represents the contribution from antenna 2 and S is the power density at a particular point. Power density S is calculated as the contribution of the power densities of antennas 1 and 2, expressed as a percentage of the exposure limit. The graphic representation is based on calculations of the contributions of all the involved antennas in the site. The calculations for the percent contributions of antenna 1 and antenna 2 are set forth in Equations 6 and 7 below.

$$C1 = \frac{S_1}{S_{1stnd}} \qquad 6$$

$$C2 = \frac{S_2}{S_{2stnd}} \qquad 7$$

Where:
$S_1$=power density of antenna 1
$S_{1stnd}$=exposure limit of antenna 1
$S_2$=power density of antenna 2
$S_{2stnd}$=exposure limit of antenna 2

The known variables in these equations are the position of the antennas in two dimensional space based on an X and Y coordinate system set forth in FIG. 10 and FIG. 12, and the limit of the power density, for example, as defined by a governmental regulation.

Figure 16:
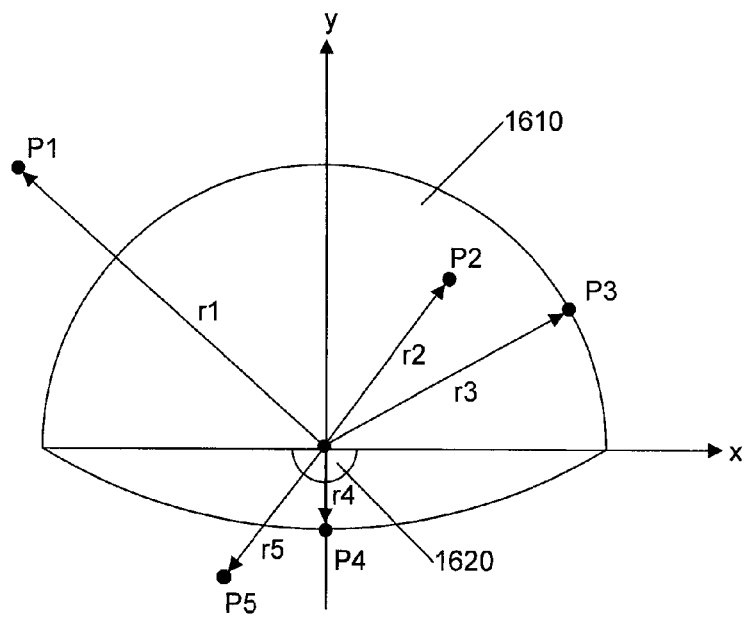
FIG. 16 represents the power density of a single antenna in different points in space.

FIG. 16 represents the power density of a single antenna in different points in space. The point at P1 has a power density under the limit beyond the MPE boundaries. The point P2 has a power density above the limits which falls within the MPE boundaries. The point P3 falls on the outer edge of the MPE boundaries and has a power density equal to the limit, referred to as the limit point. Point P4 is at a distance r4 from the antenna and r4=front-to-back ratio multiplied by r3. The antenna 1620 has a front-to-back ration of 10% and therefore P4 has a power density equal to the limit as does P3. Point P5 is located outside of the antenna's rear radiation MPE boundary.

In order to calculate the power densities for such a site with more than one more antenna structure, the standard MPE limits calculations need to be modified in order to generate cumulative radiation patterns which include the contribution of all the individual antennas. To calculate the power density at certain point in the P1 and determine whether it exceeds acceptable limits, the total sum of individual contributions of the various antenna at the site need to be calculated. $P_c$ is the calculation used to determine whether the power density at a particular site is below or in excess of acceptable limits. If $p_c$ is greater than 1, the power density is above acceptable limits. If $p_c$ is less than 1, then the power density is within acceptable limits. In order to calculate $p_c$, equation 8 set forth below is used.

$$p_c = \frac{pa1}{ps1} + \frac{pa2}{ps2} + \ldots + \frac{pa_n}{ps_n} \qquad 8$$

Where:
pa1=is actual power density based on r1 (distance from center of the antenna) and antenna power
ps1=is known limit for antenna a1
pc=number that expresses if the power density reaches its limit With this calculation the values obtained from each antenna at a site are added together to determine if the power at the particular point in space exceeds the MPE limits. Even if individual radiations at a particular antenna does not reach the MPE limits, the final radiation as a contribution of all antennas may reach the MPE limits. It is important to note that power density limits for individual antennas could be different for each antenna.

FIG. 17 represents the power density contribution of two antennas to a point in space. It is a diagram which represents the power density contribution of two antennas 1710 and 1720 to a point in space labeled P1. The individual radiation pattern map of antenna 1710 is shown at 1712 and the individual radiation pattern map of antenna 1720 is shown at 1722. The combined radiation pattern map for both antennas is represented by 1730.

FIG. 18 is a diagram which represents the participation of multiple antennas in the contribution model applied to an antenna array. There are three sectors represented in FIG. 18 being 1810, 1820 and 1830. The points labeled P1 and P2 are used to discuss power density at those points in two dimensional space in a contribution model. The power density at P1 is affected by antenna 1 (1819), antenna 2 (1818), antenna 3 (1816) and antenna 4 (1814) at sector 1810. All of the antennas on sector 1810 contribute to the power density at P1. The power density at P2 is affected by antennas 1819, 1818, 1816, 1814 of sector 1810 and antennas 1834 and 1836 of sector 1830. P2 is within the area where possible contributions of sector 1830 and sector 1810 overlap and therefore the power contributed by antennas on both sectors are taken into account.

Figure 19:
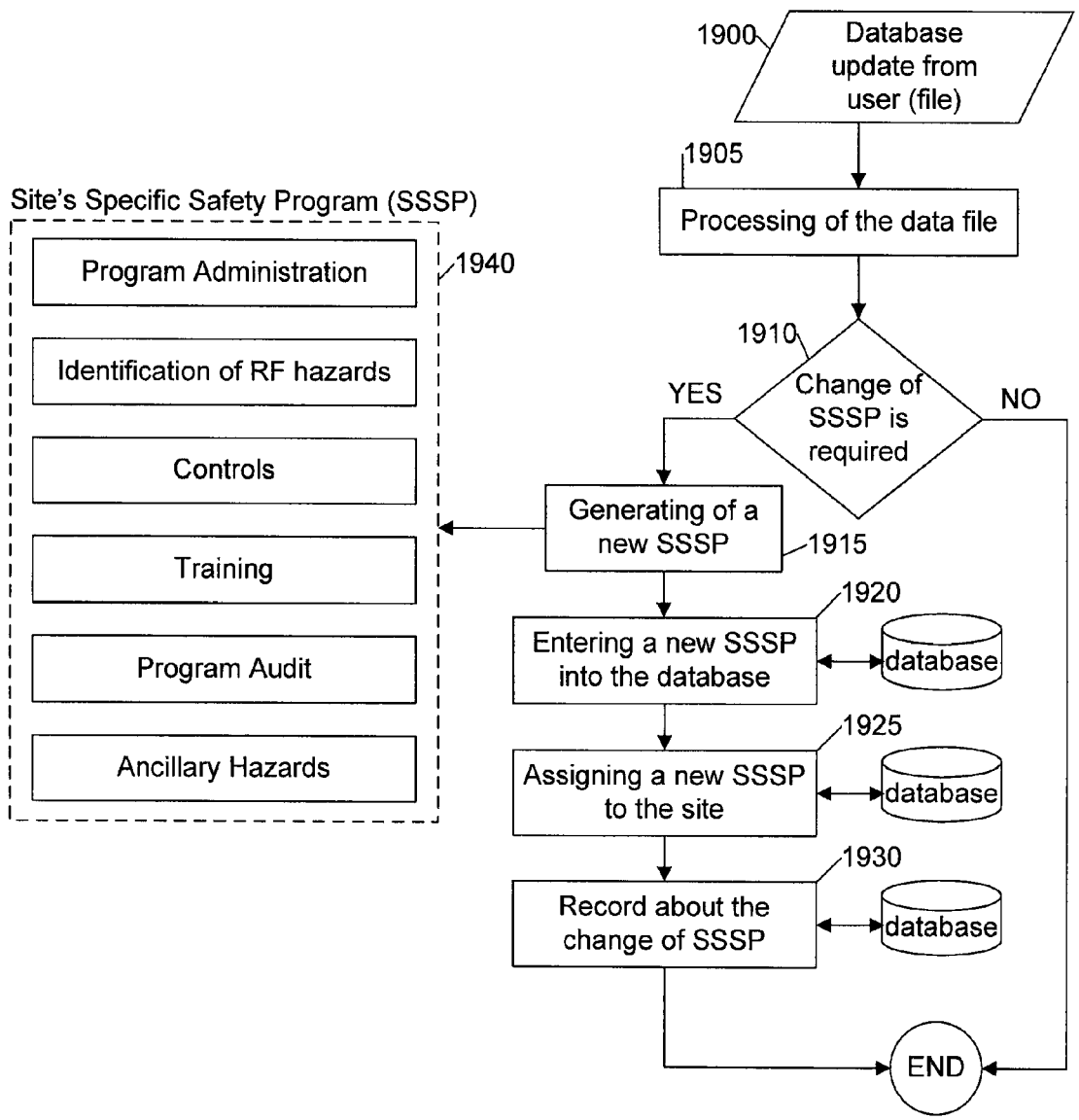
FIG. 19 is a flow diagram of one embodiment of an automated safety audit program.

FIG. 19 is a flow diagram of one embodiment of an Automated Safety Audit Program of FIG. 4. Site specific safety program module 433 of FIG. 4 provides user access to a site specific safety program (SSSP). One embodiment of a SSSP as depicted in FIG. 19 contains the following categories of information:

"program administration" which includes policies, RF safety officer information, contacts and documentation;

"identification of RF hazards" which identifies RF sources and MPE maps for the site, identifies exposure, has evaluations and classifications of certification;

"controls" which includes energy controls, signs to look for, safe work practices, RF monitoring, and personnel protective practices;

"training" which includes training programs for general pubic workers in areas where RF energy is too low to cause exposure above public limits, for workers in areas where energy may cause exposure above public limits, and for workers in areas where RF may cause exposure in excess of occupational limits unless workers utilize special controls and records of who has received the training;

"program audit" which contains information regarding responsibilities and audit reports; and "ancillary hazards" including fall protection, lockout agent, and extreme weather precautions see. The data for the SSSP is contained in the database (see FIG. 2A table 214). Automated safety audit program updates a site's safety program when relevant changes are made at the site.

Referring to FIG. 19 automated safety audit program processes database update file from user at step 1900. In one embodiment, the update data file includes an array of keys and values, where 'key' is the identification of the columns in the database and 'value' is an updated value. If the file does not include a key for the particular database column, the process considers that the value was not changed and the current value is used if the site specific safety program (SSSP) needs to be changed. If new data is entered, the process proceeds to step 1905. At step 1905 the data entered by the user is processed by the System. The process determines if the updated values effect the existing SSSP, or if data directly include values that need to be changed in the SSSP. The following are examples of this process.

Example 1: If the input power of the transmitter is changed, this will change the location of the MPE boundaries. The MPE limits would then need to be recalculated and the existing SSSP would need to be changed. A new or modified SSSP would then be generated to replace the existing one.

Example 2: if the data update file includes a new site's RF safety officer, the information for the RF safety officer would need to be changed and a new SSSP would then be generated to replace the existing one.

Example 3: If the broadcasting frequency was changed, but it doesn't affect any part of the existing SSSP, then a new SSSP will not be generated.

At step 1910 if no change to the SSSP is required the process ends. However, if a change to the SSSP is required the process proceeds to step 1915 where a new or modified SSSP is generated. Once a new SSSP is generated, the system proceeds to step 1920 where the new SSSP is entered into the database. At step 1925 the new SSSP is given a unique id and assigned to the site. At step 1930 the process records the SSSP id change in the database. This record includes data on the old SSSP id, the new SSSP id, and the site identification code as seen in table 210 and 214 of FIG. 2A.

Figure 20:
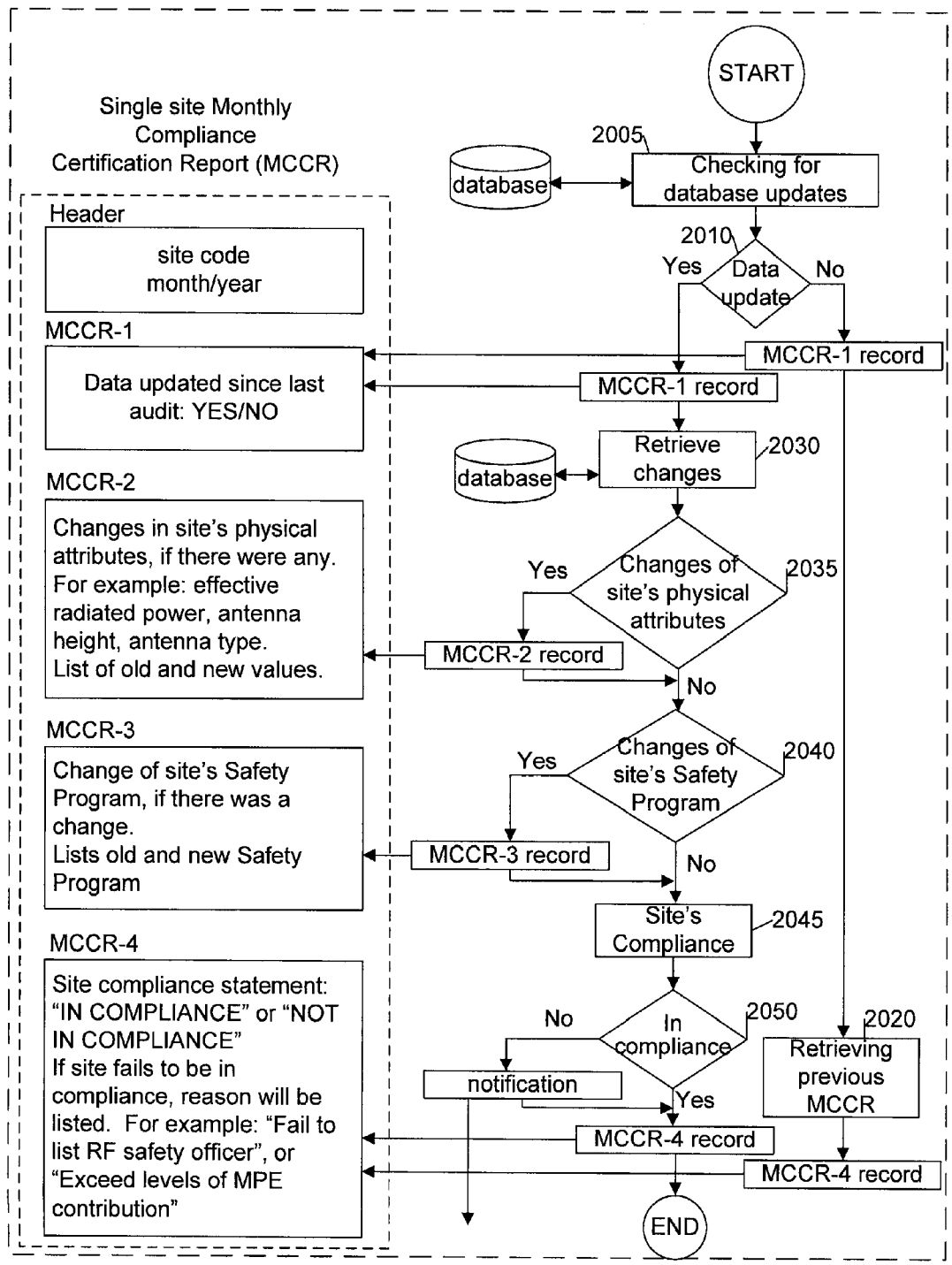
FIGS. 20 and 21 are flow diagrams of one embodiment of the automated compliance audit program.
Figure 21:
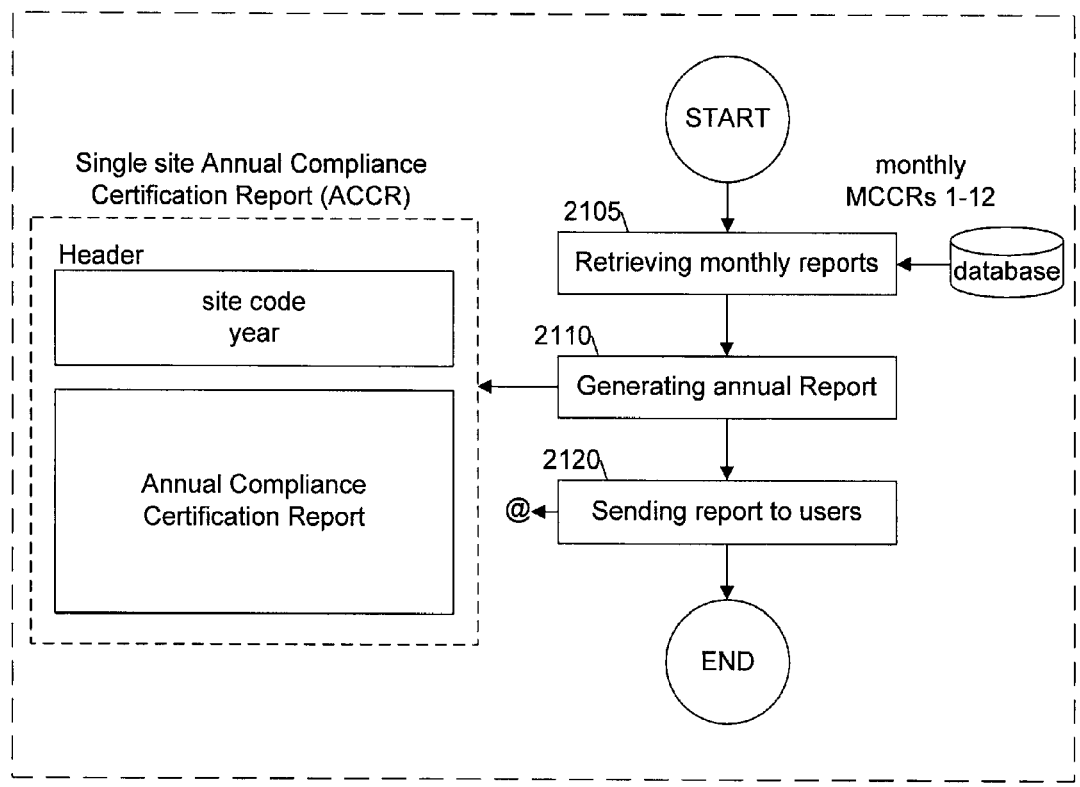

FIGS. 20 and 21 are flow diagrams of one embodiment of an automated compliance audit program (ACAP) implemented by the automated compliance audit module 446 of FIG. 4. The System executes a periodic, for example, monthly, ACAP for every site and creates and stores a monthly compliance certificate report (MCCR) as shown in FIG. 20. In one embodiment the MCCR includes the site code and the date (header), indicates whether the data has been updated since the last audit (MCCR-1), indicates what changes were made to the site since the last audit (MCCR-2), lists both the old and new safety programs if a new program was created (MCCR-3) and states whether the site is in compliance (MCCR-4). If the site is not in compliance System sends notification to the appropriate party. The System can also execute an annual compliance certificate report ("ACCR") for all users and the sites they manage. The ACCR reports can be automatically generated and sent to the users as seen in FIG. 21. The MCCRs and the ACCRs are generated as computer records and/or printed. The computer records are time stamped and encrypted so that they cannot be altered. These reports are designed to meet the requirements of all applicable regulations, such as international, Federal and State regulations.

Referring to FIG. 20 at step 2005 the process checks the database for any new data updates since the last audit. At step 2010 if no data updates are found, the System generates an MCCR-1 record indicating that no changes have occurred. The proceeds to step 2020 where the previous MCCR is retrieved. The MCCR is updated monthly and used in the final site compliance statement MCCR-4. The process determines whether the site is in compliance with the current regulations applicable to that site. The System includes all applicable regulations. The System can also determine which regulations apply to the site. Whether the site is in compliance is then added to the MCCR. If the site is not in compliance, the reason for the non-compliance is added to the MCCR and notification is sent to the appropriate party. For example the reason could be "failure to list RF safety officer" or "exceeds the MPE limits". Finally, the MCCR record is time stamped and encrypted so that it cannot be altered.

At step 2010 if updated data is found, the process proceeds to step 2030. At step 2030 the process retrieves data changes from the database. At step 2035 the process determines if the data changes relate to the site's physical attributes, for example effective radiated power, antenna height, antenna type. If the changes relate to the sites physical attributes, the process generates a list of old and new values which are stored in the MCCR and the process proceeds to step 2040. If the changes don't relate to the sites physical attributes the process proceeds to step 2040. At step 2040 the process verifies any change in the site specific safety program since the last MCCR. If a change occurs the System creates an MCCR record that lists the old and new site safety program and the process proceeds to step 2045. At step 2045 the System analyzes updated data and determines if the site is in compliance with the applicable regulations. At step 2050, if the site is in compliance, the System creates site compliance statement MCCR-4 which states "IN COMPLIANCE" and ends the process. If the site is not in compliance, the System sends notification to appropriate party, creates a site compliance statement MCCR-4 which states "NOT IN COMPLIANCE", describes the reasons for the non-compliance and ends the process.

Referring to FIG. 21 at step 2105 the process retrieves the MCCR's from the database for the site being audited. At step 2110 an ACCR is generated by compiling all of the data from the MCCR's. The ACCR contains a site code year and an annual compliance certificate report. At step 2120 the ACCR is time stamped, encrypted and stored in database. Additionally, a copy of the ACCR can be sent to the user associated with the site.

Various embodiments may also be implemented using a combination of both hardware and software.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such the processor can read information from, and write information to, the storage medium. In the alternative, the storage medium can be integral to the processor. The processor and the storage medium can reside in an ASIC.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A system for managing and viewing radio transmission information for transmission sites comprising:
    a database including data on a plurality of sites having antenna structures owned by a plurality of wireless telecommunication companies with each antenna structure having one or more antennas;
    a maximum permissible exposure (MPE) mapping module configured to display a transmission site's antenna structures with associated elements, calculate the transmission site's associated MPE limits, and create graphic representation of MPE maps; and
    a site specific safety program module configured to maintain safety programs for the plurality of the transmission sites and to update a safety program for the transmission site when data associated with the transmission site is changed.

2. The system of claim 1, further comprising:
    a power down request module configured to allow a user to request that the power of one antenna structure or multiple antenna structures at a site can be reduced or turned off; and
    a data update request module configured to edit data of a sites antenna structure, process the edited data, and send the edited data to the database.

3. The system of claim 2 wherein the power down request module is further configured to
    send an email to the operator, site owner, property management company and city or municipality associated with the site where the antenna structure is located;
    create a database entry about the power down request; and
    send a confirmation of the power shut down or power reduction to the user.

4. The system of claim 2, further comprising:
    a database administration module configured to upload site raw data, provide this data to the database, and track usage of the system;
    a database data update administration module configured to send data update reminders through the data update request module, receive information from the data update request module, and notify the database of newly received or updated data; and
    a database audit module configured to create monthly and yearly site compliance reports create site specific safety programs.

5. The system of claim 1, further comprising an engineering tool module configured to utilize dynamic resident database information to
    calculate intermodulation between two or more antennas,
    calculate isolation between two or more antennas, and
    create try out sites with associated MPE maps.

6. The system of claim 1, further comprising:
    a camera views module configured to load external panoramic images of the site with zoom and slideshow capabilities; and
    a contact information module configured to display information on the site broadcaster, site owner, property management company, and city or municipality.

7. The method of claim 1, wherein the MPE maps further comprise indications of areas where the power density may exceed maximum exposure limits for the general public but are safe for trained workers.

8. The method of claim 7, wherein the MPE maps further comprise indications of areas wherein the power densities are further defined into areas where the radio frequency may cause exposure in excess of occupational limits unless special controls are utilized in areas where the energy exceeds maximum exposure limits.

9. A method for managing and viewing radio transmission information for transmission sites, the method comprising:
    creating a database including data on a plurality of transmission sites having antenna structures owned by a plurality of wireless telecommunication companies with each antenna structure having one or more antennas;
    displaying a transmission site's antenna structures with associated elements;
    calculating the transmission site's associated maximum permissible exposure (MPE) limits;
    creating a graphic representation of MPE maps;
    maintaining safety programs for the plurality of transmission sites; and
    updating a safety program for a transmission site when data associated with the transmission site is changed.

10. The method of claim 9, further comprising:
    editing data of a transmission site's antenna structure;
    processing the edited data; and
    sending the edited data to the database.

11. The method of claim 10, further comprising:
    sending an email to an operator, a transmission site owner, a property management company and a city or municipality associated with the transmission site where the antenna structure is located;

creating a database entry about a power down request; and
sending a confirmation of the power shut down or power reduction to the user.

12. The method of claim 10, further comprising:
uploading transmission site raw data;
providing this raw data to the database;
tracking usage of the radio transmission information;
sending data update reminders;
receiving information in response to the sending data update reminders;
notifying the database of newly received or updated data; and
creating monthly and yearly transmission site compliance reports create transmission site specific safety programs.

13. The method of claim 9, further comprising:
calculating intermodulation between two or more antennas utilizing dynamic resident database information;
calculating isolation between two or more antennas utilizing dynamic resident database information; and
creating try out transmission sites with associated MPE maps utilizing dynamic resident database information.

14. The method of claim 9, further comprising:
loading external panoramic images of the transmission site with zoom and slideshow capabilities; and
displaying information on the transmission site broadcaster, transmission site owner, property management company, and city or municipality.

15. The method of claim 9, wherein the MPE maps further comprise indications of areas where the power density may exceed maximum exposure limits for the general public but are safe for trained workers.

16. The method of claim 15, wherein the MPE maps further comprise indications of areas wherein the power densities are further defined into areas where the radio frequency may cause exposure in excess of occupational limits unless special controls are utilized in areas where the energy exceeds maximum exposure limits.

* * * * *